United States Patent
Asai

(10) Patent No.: US 12,206,129 B2
(45) Date of Patent: *Jan. 21, 2025

(54) SLURRY COMPOSITION FOR NON-AQUEOUS SECONDARY BATTERY FUNCTIONAL LAYER, FUNCTIONAL LAYER FOR NON-AQUEOUS SECONDARY BATTERY, SEPARATOR FOR NON-AQUEOUS SECONDARY BATTERY, AND NON-AQUEOUS SECONDARY BATTERY

(71) Applicant: ZEON CORPORATION, Tokyo (JP)

(72) Inventor: Kazuki Asai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 811 days.

This patent is subject to a terminal disclaimer.

(21) Appl. No.: 17/268,478

(22) PCT Filed: Aug. 15, 2019

(86) PCT No.: PCT/JP2019/032029
§ 371 (c)(1),
(2) Date: Feb. 15, 2021

(87) PCT Pub. No.: WO2020/040031
PCT Pub. Date: Feb. 27, 2020

(65) Prior Publication Data
US 2021/0242533 A1 Aug. 5, 2021

(30) Foreign Application Priority Data
Aug. 24, 2018 (JP) .................... 2018-157495

(51) Int. Cl.
*H01M 50/411* (2021.01)
*H01M 4/62* (2006.01)
*H01M 50/409* (2021.01)

(52) U.S. Cl.
CPC ......... *H01M 50/411* (2021.01); *H01M 4/622* (2013.01); *H01M 50/409* (2021.01)

(58) Field of Classification Search
CPC ............................ H01M 50/411; H01M 4/622
See application file for complete search history.

(56) References Cited

U.S. PATENT DOCUMENTS

| 9,780,348 B2 | 10/2017 | Kagami et al. |
| 10,586,966 B2 | 3/2020 | Takamatsu |

(Continued)

FOREIGN PATENT DOCUMENTS

| CN | 104733775 A | 6/2015 |
| EP | 3046163 A1 | 7/2016 |

(Continued)

OTHER PUBLICATIONS

Sep. 17, 2019, International Search Report issued in the International Patent Application No. PCT/JP2019/032029.

(Continued)

*Primary Examiner* — Olatunji A Godo
(74) *Attorney, Agent, or Firm* — KENJA IP LAW PC

(57) ABSTRACT

Provided is a slurry composition for a non-aqueous secondary battery functional layer with which it is possible to form a functional layer that has excellent adhesiveness and that can improve rate characteristics of a non-aqueous secondary battery. The slurry composition for a non-aqueous secondary battery functional layer contains organic particles, a binder, and a melamine compound. The melamine compound constitutes a proportion of not less than 0.5 mass % and not more than 85 mass % among the total of the binder and the melamine compound.

7 Claims, 1 Drawing Sheet

(56) References Cited

U.S. PATENT DOCUMENTS

| | | | |
|---|---|---|---|
| 11,329,288 B2 | 5/2022 | Yano et al. | |
| 2015/0072213 A1 | 3/2015 | Kaneda | |
| 2015/0179998 A1 | 6/2015 | Kagami et al. | |
| 2015/0188143 A1* | 7/2015 | Shiozaki | H01M 4/628 429/215 |
| 2015/0214551 A1* | 7/2015 | Ito | H01M 4/661 429/233 |
| 2016/0141575 A1 | 5/2016 | Sasaki et al. | |
| 2016/0218340 A1 | 7/2016 | Ryu et al. | |
| 2017/0117521 A1 | 4/2017 | Sasaki | |
| 2018/0351149 A1* | 12/2018 | Akiike | H01M 10/058 |
| 2021/0184313 A1* | 6/2021 | Asai | H01M 50/461 |

FOREIGN PATENT DOCUMENTS

| | | |
|---|---|---|
| JP | 2000021408 A | 1/2000 |
| JP | 2015118841 A | 6/2015 |
| KR | 1020170086034 A | 7/2017 |
| WO | 2013141140 A1 | 9/2013 |
| WO | 2013146515 A1 | 10/2013 |
| WO | 2015005151 A1 | 1/2015 |
| WO | 2015198530 A1 | 12/2015 |
| WO | 2017104770 A1 | 6/2017 |
| WO | WO-2017094252 A1 * | 6/2017 ............ C08F 220/44 |

OTHER PUBLICATIONS

Mar. 2, 2021, International Preliminary Report on Patentability issued in the International Patent Application No. PCT/JP2019/032029.

Apr. 8, 2022, the Extended European Search Report issued by the European Patent Office in the corresponding European Patent Application No. 19853191.5.

* cited by examiner

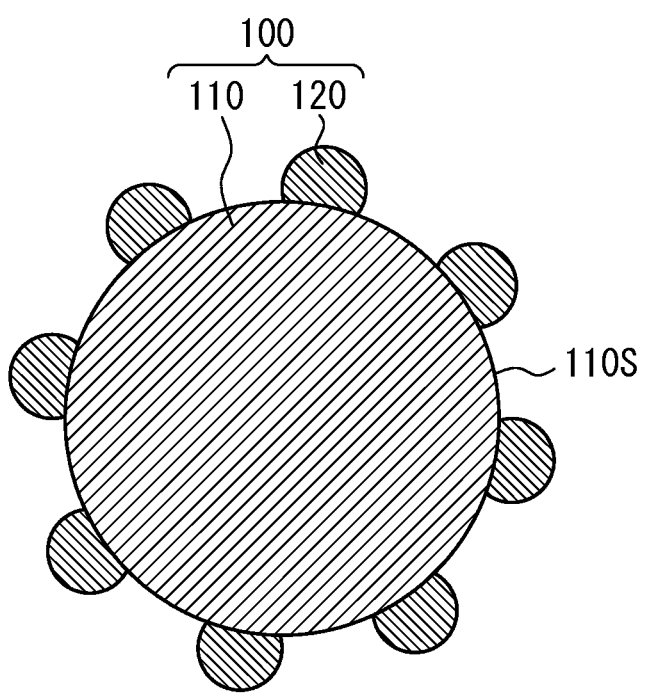

SLURRY COMPOSITION FOR NON-AQUEOUS SECONDARY BATTERY FUNCTIONAL LAYER, FUNCTIONAL LAYER FOR NON-AQUEOUS SECONDARY BATTERY, SEPARATOR FOR NON-AQUEOUS SECONDARY BATTERY, AND NON-AQUEOUS SECONDARY BATTERY

TECHNICAL FIELD

The present disclosure relates to a slurry composition for a non-aqueous secondary battery functional layer, a functional layer for a non-aqueous secondary battery, a separator for a non-aqueous secondary battery, and a non-aqueous secondary battery.

BACKGROUND

Non-aqueous secondary batteries (hereinafter, also referred to as "secondary batteries") such as lithium ion secondary batteries have characteristics such as compact size, light weight, high energy density, and the ability to be repeatedly charged and discharged, and are used in a wide variety of applications.

A secondary battery typically includes members for a non-aqueous secondary battery (hereinafter, also referred to as "battery members") such as electrodes (positive electrode and negative electrode) and a separator that isolates the positive electrode and the negative electrode from each other and prevents short-circuiting between the positive and negative electrodes. A layer may be provided at the surface of an electrode and/or a separator in order to impart a specific function to the battery member, such as a porous membrane layer for improving heat resistance and strength, or an adhesive layer aimed at improving adhesiveness between battery members (hereinafter, such layers are also referred to by the general term "functional layer for a non-aqueous secondary battery" or "functional layer"). More specifically, electrodes that include a functional layer formed on an electrode substrate including a current collector and an electrode mixed material layer and separators that include a functional layer formed on a separator substrate are currently being used as battery members.

A functional layer is formed by, for example, applying a slurry composition for a non-aqueous secondary battery functional layer that contains a polymer component, such as organic particles and/or a binder, onto a substrate, such as an electrode substrate or a separator substrate, and then drying a coating film on the substrate.

In one example, Patent Literature (PTL) 1 discloses a technique of providing a porous membrane layer at a surface of a battery member of a lithium ion secondary battery using a composition that contains organic particles having a specific core-shell structure and a binder. According to PTL 1, the porous membrane layer that is formed as a functional layer using this composition has excellent binding capacity in electrolyte solution and can cause a lithium ion secondary battery to display excellent low-temperature output characteristics.

CITATION LIST

Patent Literature

PTL 1: WO2015/005151A1

SUMMARY

Technical Problem

With regards to the conventional functional layer described above, there has been demand for further improving adhesiveness while also causing a secondary battery to display even better rate characteristics.

Accordingly, one object of the present disclosure is to provide a slurry composition for a non-aqueous secondary battery functional layer with which it is possible to form a functional layer that has excellent adhesiveness and that can improve rate characteristics of a non-aqueous secondary battery.

Another object of the present disclosure is to provide a functional layer for a non-aqueous secondary battery that has excellent adhesiveness and that can improve rate characteristics of a non-aqueous secondary battery.

Another object of the present disclosure is to provide a separator for a non-aqueous secondary battery that can closely adhere well to another battery member that is adjacent thereto and that can cause a non-aqueous secondary battery to display excellent rate characteristics.

Another object of the present disclosure is to provide a non-aqueous secondary battery that has excellent rate characteristics.

Solution to Problem

The inventor conducted diligent investigation with the aim of solving the problems set forth above. The inventor discovered that by forming a functional layer using a slurry composition that contains organic particles, a binder, and a melamine compound and in which the proportion constituted by the melamine compound among the total of the binder and the melamine compound is within a specific range, adhesiveness of the obtained functional layer can be increased while also causing a secondary battery that includes the functional layer to display excellent rate characteristics. In this manner, the inventor completed the present disclosure.

Specifically, the present disclosure aims to advantageously solve the problems set forth above, and a presently disclosed slurry composition for a non-aqueous secondary battery functional layer comprises organic particles, a binder, and a melamine compound, wherein the melamine compound constitutes a proportion of not less than 0.5 mass % and not more than 85 mass % among a total of the binder and the melamine compound. By using a slurry composition that contains a binder, organic particles, and a melamine compound and in which the proportion constituted by the melamine compound among the total of the binder and the melamine compound is within the range set forth above in this manner, it is possible to obtain a functional layer having excellent adhesiveness. Moreover, by using a battery member that includes this functional layer, it is possible to cause a secondary battery to display excellent rate characteristics.

Note that the "organic particles" and the "binder" referred to in the present disclosure are each a component that is formed of a polymer. Herein, the organic particles have a glass-transition temperature of 25° C. or higher, whereas the binder has a glass-transition temperature of lower than 25° C. The "glass-transition temperature" referred to in the present disclosure can be measured by a method described in the EXAMPLES section of the present specification.

In the presently disclosed slurry composition for a non-aqueous secondary battery functional layer, the binder is preferably a polymer including at least one functional group selected from the group consisting of a carboxy group, a hydroxyl group, an amino group, an epoxy group, an oxazoline group, a sulfo group, a nitrile group, and an amide group. By using a polymer that includes at least any one of the functional groups set forth above as the binder, adhesiveness of a functional layer and rate characteristics of a secondary battery can be further improved.

In the presently disclosed slurry composition for a non-aqueous secondary battery functional layer, the organic particles preferably have a volume-average particle diameter of not less than 150 nm and not more than 2,000 nm. When the volume-average particle diameter of the organic particles is within the range set forth above, adhesiveness of a functional layer and rate characteristics of a secondary battery can be further improved while also causing the secondary battery to display excellent cycle characteristics.

Note that the "volume-average particle diameter" referred to in the present disclosure can be measured by a method described in the EXAMPLES section of the present specification.

In the presently disclosed slurry composition for a non-aqueous secondary battery functional layer, the organic particles preferably have a core-shell structure including a core portion and a shell portion at least partially covering an outer surface of the core portion. By using organic particles having a core-shell structure, rate characteristics of a secondary battery can be further improved.

In the presently disclosed slurry composition for a non-aqueous secondary battery functional layer, the organic particles preferably have a larger volume-average particle diameter than the binder. When the volume-average particle diameter of the organic particles is larger than the volume-average particle diameter of the binder, rate characteristics of a secondary battery can be further improved while also causing the secondary battery to display excellent cycle characteristics.

In the presently disclosed slurry composition for a non-aqueous secondary battery functional layer, the melamine compound is preferably at least one selected from the group consisting of melamine, ammeline, and melamine cyanurate. When the melamine compound is melamine, ammeline, and/or melamine cyanurate, adhesiveness of a functional layer and rate characteristics of a secondary battery can be further improved.

Moreover, the present disclosure aims to advantageously solve the problems set forth above, and a presently disclosed functional layer for a non-aqueous secondary battery is formed using any one of the slurry compositions for a non-aqueous secondary battery functional layer set forth above. A functional layer that is formed from any one of the slurry compositions set forth above has excellent adhesiveness. Moreover, by using a battery member that includes this functional layer, it is possible to cause a secondary battery to display excellent rate characteristics.

Furthermore, the present disclosure aims to advantageously solve the problems set forth above, and a presently disclosed separator for a non-aqueous secondary battery comprises: a separator substrate; and the functional layer for a non-aqueous secondary battery set forth above. A separator in which a separator substrate and the functional layer for a non-aqueous secondary battery set forth above are stacked can closely adhere well to another battery member (particularly an electrode) that is adjacent thereto and can cause a secondary battery to display excellent rate characteristics.

Also, the present disclosure aims to advantageously solve the problems set forth above, and a presently disclosed non-aqueous secondary battery comprises the functional layer for a non-aqueous secondary battery set forth above. A secondary battery that includes the functional layer set forth above has excellent battery characteristics such as rate characteristics.

Advantageous Effect

According to the present disclosure, it is possible to provide a slurry composition for a non-aqueous secondary battery functional layer with which it is possible to form a functional layer that has excellent adhesiveness and that can improve rate characteristics of a non-aqueous secondary battery.

Moreover, according to the present disclosure, it is possible to provide a functional layer for a non-aqueous secondary battery that has excellent adhesiveness and that can improve rate characteristics of a non-aqueous secondary battery.

Furthermore, according to the present disclosure, it is possible to provide a separator for a non-aqueous secondary battery that can closely adhere well to another battery member that is adjacent thereto and that can cause a non-aqueous secondary battery to display excellent rate characteristics.

Also, according to the present disclosure, it is possible to provide a non-aqueous secondary battery having excellent rate characteristics.

BRIEF DESCRIPTION OF THE DRAWING

In the accompanying drawing,

FIG. 1 is a cross-sectional view schematically illustrating the structure of one example of an organic particle contained in a slurry composition for a non-aqueous secondary battery functional layer.

DETAILED DESCRIPTION

The following provides a detailed description of embodiments of the present disclosure.

The presently disclosed slurry composition for a non-aqueous secondary battery functional layer can be used to form a functional layer having a function such as reinforcement and/or adhesion inside a non-aqueous secondary battery. Moreover, the presently disclosed functional layer for a non-aqueous secondary battery is formed from the presently disclosed slurry composition for a non-aqueous secondary battery functional layer. Furthermore, the presently disclosed separator for a non-aqueous secondary battery includes a separator substrate and the presently disclosed functional layer for a non-aqueous secondary battery disposed at at least one side of the separator substrate. Also, the presently disclosed non-aqueous secondary battery includes a battery member (for example, the presently disclosed separator for a non-aqueous secondary battery) that includes the presently disclosed functional layer for a non-aqueous secondary battery.

(Slurry Composition for Non-Aqueous Secondary Battery Functional Layer)

The presently disclosed slurry composition is a composition containing organic particles, a binder, and a melamine compound that are dissolved and/or dispersed in a solvent. Note that the presently disclosed slurry composition may contain components other than the organic particles, the binder, the melamine compound, and the solvent (i.e., other components). In the presently disclosed slurry composition, the proportion constituted by the amount of the melamine compound among 100 mass %, in total, of the amount of the binder and the amount of the melamine compound is not less than 0.5 mass % and not more than 85 mass %.

As a consequence of the amount of the melamine compound constituting not less than 0.5 mass % and not more than 85 mass % among the total amount of the binder and the melamine compound in the presently disclosed slurry composition, the melamine compound and the binder act in conjunction to display excellent binding capacity, which is presumed to be a result of good interactions, such as hydrogen bonding, between the melamine compound and the binder. It is thought that for this reason, a functional layer formed using the slurry composition has excellent adhesiveness and can cause a secondary battery including the functional layer to display excellent battery characteristics (rate characteristics, etc.).

<Organic Particles>

The organic particles are particles that are formed from one polymer or a plurality of polymers and that can maintain their particulate form in the slurry composition and in a functional layer. Moreover, the organic particles are a component that can improve various characteristics such as strength of a functional layer formed using the slurry composition. Note that the organic particles are normally water-insoluble. When a given component is referred to as "water-insoluble" in the present disclosure, this means that when 0.5 g of the component is dissolved in 100 g of water at 25° C., insoluble content is 90 mass % or more.

<<Properties of Organic Particles>>

[Volume-Average Particle Diameter]

The volume-average particle diameter of the organic particles is preferably 150 nm or more, more preferably 200 nm or more, even more preferably 300 nm or more, particularly preferably 400 nm or more, and most preferably 500 nm or more, and is preferably 2,000 nm or less, more preferably 1,500 nm or less, and even more preferably 1,000 nm or less. When the volume-average particle diameter of the organic particles is 150 nm or more, rate characteristics of a secondary battery including a functional layer that is formed using the slurry composition can be further enhanced while also improving cycle characteristics of the secondary battery. On the other hand, when the volume-average particle diameter of the organic particles is 2,000 nm or less, adhesiveness of a functional layer that is formed using the slurry composition can be further increased, and two adjacent battery members can closely adhere more strongly via the functional layer.

The volume-average particle diameter of the organic particles is preferably larger than the volume-average particle diameter of the binder described further below. When the volume-average particle diameter of the organic particles is larger than the volume-average particle diameter of the binder, rate characteristics of a secondary battery including a functional layer that is formed using the slurry composition can be further enhanced while also improving cycle characteristics of the secondary battery.

[Degree of Swelling in Electrolyte Solution]

The degree of swelling in electrolyte solution of the organic particles is preferably 150 mass % or more, more preferably 200 mass % or more, and even more preferably 300 mass % or more, and is preferably 1,500 mass % or less, and more preferably 1,000 mass % or less. When the degree of swelling in electrolyte solution of the organic particles is within any of the ranges set forth above, rate characteristics of a secondary battery including a functional layer that is formed using the slurry composition can be further enhanced while also improving cycle characteristics of the secondary battery.

Note that the "degree of swelling in electrolyte solution" referred to in the present disclosure can be measured by a method described in the EXAMPLES section of the present specification.

[Glass-Transition Temperature]

The glass-transition temperature of the organic particles is 25° C. or higher, preferably 40° C. or higher, and more preferably 45° C. or higher, and is preferably 95° C. or lower, more preferably 60° C. or lower, and even more preferably 55° C. or lower. When the glass-transition temperature of the organic particles is lower than 25° C., adhesiveness of a functional layer formed using the slurry composition cannot be sufficiently increased, and two adjacent battery members cannot closely adhere strongly via the functional layer. On the other hand, when the glass-transition temperature of the organic particles is 95° C. or lower, rate characteristics of a secondary battery including a functional layer that is formed using the slurry composition can be further improved.

<<Type of Organic Particles>>

The organic particles may be particles that are formed of one type of polymer (single-polymer particles) or may be particles that are formed of two or more types of polymers (composite-polymer particles). Note that the organic particles may contain a component other than a polymer (for example, a production aid used in production of a polymer).

[Single-Polymer Particles]

No specific limitations are placed on a polymer that forms single-polymer particles. For example, a polymer that includes an aromatic monovinyl monomer unit and a polyvalent ethylenically unsaturated cross-linkable monomer unit can preferably be used. This polymer may include repeating units other than an aromatic monovinyl monomer unit and a polyvalent ethylenically unsaturated cross-linkable monomer unit (i.e., other repeating units).

The phrase "includes a monomer unit" as used in the present disclosure means that "a polymer obtained with the monomer includes a repeating unit derived from the monomer".

—Aromatic Monovinyl Monomer Unit—

Examples of aromatic monovinyl monomers that can form an aromatic monovinyl monomer unit include styrene, styrene sulfonic acid and salts thereof (sodium styrenesulfonate, etc.), α-methylstyrene, vinyltoluene, and 4-(tert-butoxy)styrene. Of these aromatic monovinyl monomers, styrene and sodium styrenesulfonate are preferable, and styrene is more preferable. Note that one aromatic monovinyl monomer may be used individually, or two or more aromatic monovinyl monomers may be used in combination in a freely selected ratio.

The proportional content of an aromatic monovinyl monomer unit in a polymer forming single-polymer particles as the organic particles when the amount of all repeating units included in the polymer is taken to be 100 mass % is preferably 20 mass % or more, more preferably 40 mass % or more, and even more preferably 60 mass % or more, and is preferably 80 mass % or less, more preferably 77 mass % or less, and even more preferably 75 mass % or less. When the proportional content of an aromatic monovinyl monomer unit in the polymer forming the organic particles is 20 mass % or more, elution of the organic particles into electrolyte solution can be inhibited, and rate characteristics of a secondary battery can be further improved. Moreover, the strength of the organic particles can be sufficiently expressed, which makes it possible to ensure adhesiveness of a functional layer while also inhibiting sticking together (i.e., blocking) of adjacent battery members via the functional layer during storage and transport of a battery member that includes the functional layer. On the other hand, when the proportional content of an aromatic monovinyl monomer unit in the polymer forming the organic particles is 80 mass % or less, adhesiveness of a functional layer formed using the slurry composition can be ensured, and two adjacent battery members can closely adhere sufficiently strongly via the functional layer.

Note that the proportion in which a polymer includes each repeating unit (monomer unit) can be measured by a nuclear magnetic resonance (NMR) method such as $^1$H-NMR or $^{13}$C-NMR.

—Polyvalent Ethylenically Unsaturated Cross-Linkable Monomer Unit—

A polyvalent ethylenically unsaturated cross-linkable monomer that can form a polyvalent ethylenically unsaturated cross-linkable monomer unit is a compound that includes at least two ethylenically unsaturated bonds. Examples of polyvalent ethylenically unsaturated cross-linkable monomers include polyfunctional (meth)acrylates such as allyl (meth)acrylate, ethylene glycol di(meth)acrylate, diethylene glycol di(meth)acrylate, triethylene glycol di(meth)acrylate, tetraethylene glycol di(meth)acrylate, and trimethylolpropane tri(meth)acrylate; polyfunctional allyl/vinyl ethers such as dipropylene glycol diallyl ether, polyglycol diallyl ether, triethylene glycol divinyl ether, hydroquinone diallyl ether, and tetraallyloxyethane; and divinylbenzene. Of these polyvalent ethylenically unsaturated cross-linkable monomers, ethylene glycol di(meth)acrylate and allyl (meth)acrylate are preferable, and ethylene glycol di(meth)acrylate is more preferable. One polyvalent ethylenically unsaturated cross-linkable monomer may be used individually, or two or more polyvalent ethylenically unsaturated cross-linkable monomers may be used in combination in a freely selected ratio.

Note that in the present disclosure, "(meth)acrylate" is used to indicate "acrylate" and/or "methacrylate".

The proportional content of a polyvalent ethylenically unsaturated cross-linkable monomer unit in a polymer forming single-polymer particles as the organic particles when the amount of all repeating units included in the polymer is taken to be 100 mass % is preferably 0.01 mass % or more, more preferably 0.05 mass % or more, and even more preferably 0.1 mass % or more, and is preferably 2 mass % or less, more preferably 1.5 mass % or less, and even more preferably 1 mass % or less. When the proportional content of a polyvalent ethylenically unsaturated cross-linkable monomer unit in the polymer forming the organic particles is 0.01 mass % or more, elution of the organic particles into electrolyte solution can be inhibited, and rate characteristics of a secondary battery can be further improved. Moreover, the strength of the organic particles can be sufficiently expressed, which makes it possible to ensure adhesiveness of a functional layer while also inhibiting blocking of adjacent battery members via the functional layer during storage and transport of a battery member that includes the functional layer. On the other hand, when the proportional content of a polyvalent ethylenically unsaturated cross-linkable monomer unit in the polymer forming the organic particles is 2 mass % or less, adhesiveness of a functional layer formed using the slurry composition can be ensured, and two adjacent battery members can closely adhere sufficiently strongly via the functional layer.

—Other Repeating Units—

Examples of other repeating units include, but are not specifically limited to, a (meth)acrylic acid alkyl ester monomer unit and an acidic group-containing monomer unit.

Note that in the present disclosure, "(meth)acryl" is used to indicate "acryl" and/or "methacryl".

A (meth)acrylic acid alkyl ester monomer including one polymerizable unsaturated group per molecule can be used as a (meth)acrylic acid alkyl ester monomer that can form a (meth)acrylic acid alkyl ester monomer unit. Specific examples of (meth)acrylic acid alkyl ester monomers include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, and glycidyl methacrylate. Of these (meth)acrylic acid alkyl ester monomers, methyl methacrylate, 2-ethylhexyl acrylate, ethyl acrylate, and n-butyl acrylate are preferable from a viewpoint of further increasing adhesiveness of a functional layer formed using the slurry composition while also causing a secondary battery to display excellent cycle characteristics, with methyl methacrylate and n-butyl acrylate being more preferable. Note that one (meth)acrylic acid alkyl ester monomer may be used individually, or two or more (meth)acrylic acid alkyl ester monomers may be used in combination in a freely selected ratio.

The proportional content of a (meth)acrylic acid alkyl ester monomer unit in a polymer forming single-polymer particles as the organic particles when the amount of all repeating units included in the polymer is taken to be 100 mass % is preferably 5 mass % or more, more preferably 7 mass % or more, even more preferably 10 mass % or more, and particularly preferably 20 mass % or more, and is preferably 70 mass % or less, more preferably 60 mass % or less, even more preferably 50 mass % or less, and particularly preferably 40 mass % or less. When the proportional content of a (meth)acrylic acid alkyl ester monomer unit in the polymer forming the organic particles is 5 mass % or more, elution of the organic particles into electrolyte solution can be inhibited, and rate characteristics of a secondary battery can be further improved. On the other hand, when the proportional content of a (meth)acrylic acid alkyl ester monomer unit in the polymer forming the organic particles is 70 mass % or less, adhesiveness of a functional layer formed using the slurry composition can be ensured, and two adjacent battery members can closely adhere sufficiently strongly via the functional layer.

Examples of acidic group-containing monomers that can form an acidic group-containing monomer unit include carboxy group-containing monomers, sulfo group-containing monomers, and phosphate group-containing monomers. Note that one acidic group-containing monomer may be used individually, or two or more acidic group-containing monomers may be used in combination in a freely selected ratio.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Moreover, an acid anhydride that produces a carboxy group upon hydrolysis can be used as a carboxy group-containing monomer. Of these carboxy group-containing monomers, acrylic acid and methacrylic acid are preferable. Note that one carboxy group-containing monomer may be used individually, or two or more carboxy group-containing monomers may be used in combination in a freely selected ratio.

Examples of sulfo group-containing monomers include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid. Note that one sulfo group-containing monomer may be used individually, or two or more sulfo group-containing monomers may be used in combination in a freely selected ratio.

Also note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate. Note that one phosphate group-containing monomer may be used individually, or two or more phosphate group-containing monomers may be used in combination in a freely selected ratio.

Also note that in the present disclosure, "(meth)acryloyl" is used to indicate "acryloyl" and/or "methacryloyl".

Of these acidic group-containing monomers, carboxy group-containing monomers are preferable from a viewpoint of providing the organic particles with good physical properties and sufficiently enhancing adhesiveness of a functional layer and rate characteristics of a secondary battery, with acrylic acid, methacrylic acid, and itaconic acid being more preferable, acrylic acid and methacrylic acid even more preferable, and methacrylic acid particularly preferable. In other words, a polymer forming single-polymer particles as the organic particles preferably includes a carboxy group-containing monomer unit, more preferably includes at least one selected from the group consisting of an acrylic acid unit, a methacrylic acid unit, and an itaconic acid unit, even more preferably includes either or both of an acrylic acid unit and a methacrylic acid unit, and particularly preferably includes a methacrylic acid unit.

The proportional content of an acidic group-containing monomer unit in a polymer forming single-polymer particles as the organic particles when the amount of all repeating units included in the polymer is taken to be 100 mass % is preferably 1 mass % or more, more preferably 2 mass % or more, and even more preferably 4 mass % or more, and is preferably 15 mass % or less, more preferably 10 mass % or less, and even more preferably 7 mass % or less.

—Production Method of Single-Polymer Particles—

No specific limitations are placed on the method by which single-polymer particles are produced as the organic particles. For example, single-polymer particles serving as the organic particles can be produced through polymerization of a monomer composition that contains the monomers set forth above, carried out in an aqueous solvent. Note that the proportional content of each monomer in the monomer composition can be set in accordance with the desired proportional content of each monomer unit (repeating unit) in the polymer.

The method of polymerization is not specifically limited and can be any of solution polymerization, suspension polymerization, bulk polymerization, and emulsion polymerization, for example. Moreover, ionic polymerization, radical polymerization, living radical polymerization, various types of condensation polymerization, addition polymerization, and so forth can be adopted as the polymerization reaction. Furthermore, a known emulsifier and/or polymerization initiator can be used in the polymerization as necessary.

[Composite-Polymer Particles]

Composite-polymer particles are heterophase structures in which different polymer portions are present within the particles.

In this context, a heterophase structure refers to a single particle formed by physical or chemical bonding of two or more different polymers, and not to a particle having a monophase structure formed of a single polymer such as a block polymer. Specific examples of heterophase structures include a core-shell structure that is a spherical particle including a core portion and a shell portion at least partially covering the outer surface of the core portion that are formed from different polymers; a side-by-side structure in which two or more polymers are disposed alongside one another; a snowman structure in which part of a polymer forming a central part in a core-shell structure is exposed at an outer shell; and an octopus ocellatus structure in which a spherical polymer particle has a particle of a different type of polymer embedded in the surface thereof to form a unified structure. Of these examples, organic particles that are composite-polymer particles preferably have a core-shell structure from a viewpoint of sufficiently enhancing rate characteristics of a secondary battery.

—Core-Shell Structure—

In organic particles having a core-shell structure, the shell portion may completely cover an outer surface of the core portion or may partially cover the outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion. Therefore, an organic particle including a shell portion having pores that pass between an outer surface of the shell portion (i.e., a circumferential surface of the organic particle) and an outer surface of a core portion is considered to be an organic particle in which a shell portion partially covers the outer surface of a core portion.

FIG. 1 illustrates cross-sectional structure of one example of an organic particle. An organic particle 100 illustrated in FIG. 1 has a core-shell structure including a core portion 110 and a shell portion 120. The core portion 110 is a portion of the organic particle 100 that is located further inward than the shell portion 120. The shell portion 120 is a portion of the organic particle 100 that covers an outer surface 110S of the core portion 110 and is normally an outermost portion of the organic particle 100. In the example illustrated in FIG. 1, the shell portion 120 partially covers the outer surface 110S of the core portion 110 rather than completely covering the outer surface 110S of the core portion 110.

The organic particles having a core-shell structure may include a constituent element other than the core portion and the shell portion set forth above so long as the expected effects are not significantly lost. Specifically, the organic particles may, for example, include a portion inside of the core portion that is formed of a different polymer to the core portion. In one specific example, a residual seed particle may be present inside of the core portion in a case in which seed particles have been used in production of the core portion by seeded polymerization. However, from a viewpoint of more noticeably displaying the expected effects, it is preferable that the organic particles are composed of only the core portion and the shell portion.

—Core Portion—

Examples of monomers that can be used to produce a polymer of the core portion include vinyl chloride monomers such as vinyl chloride and vinylidene chloride; vinyl acetate monomers such as vinyl acetate; aromatic monovinyl monomers (specific examples include the aromatic monovinyl monomers given as examples in the "Single-polymer particles" section); vinylamine monomers such as vinylamine; vinylamide monomers such as N-vinylformamide and N-vinylacetamide; (meth)acrylic acid alkyl ester monomers (specific examples include the (meth)acrylic acid alkyl ester monomers given as examples in the "Single-polymer particles" section); (meth)acrylamide monomers such as acrylamide and methacrylamide; (meth)acrylonitrile monomers such as acrylonitrile and methacrylonitrile; fluorine-containing (meth)acrylic acid ester monomers such as 2-(perfluorohexyl)ethyl methacrylate and 2-(perfluorobutyl)ethyl acrylate; maleimide; and maleimide derivatives such as phenylmaleimide. One of these monomers may be used individually, or two or more of these monomers may be used in combination in a freely selected ratio.

Note that in the present disclosure, "(meth)acrylo" is used to indicate "acrylo" and/or "methacrylo".

Of these monomers, the use of a (meth)acrylic acid alkyl ester monomer as a monomer used for producing the polymer of the core portion is preferable from a viewpoint of further improving adhesiveness of a functional layer formed using the obtained slurry composition and rate characteristics of a secondary battery. Note that one (meth)acrylic acid alkyl ester monomer may be used individually, or two or more (meth)acrylic acid alkyl ester monomers may be used in combination in a freely selected ratio. Moreover, the use of either or both of methyl methacrylate and n-butyl acrylate as (meth)acrylic acid alkyl ester monomers is more preferable, and the use of both methyl methacrylate and n-butyl acrylate as (meth)acrylic acid alkyl ester monomers is even more preferable from a viewpoint of even further improving adhesiveness of a functional layer and rate characteristics of a secondary battery. In other words, the polymer of the core portion preferably includes a (meth)acrylic acid alkyl ester monomer unit, more preferably includes either or both of a methyl methacrylate unit and an n-butyl acrylate unit, and even more preferably includes both a methyl methacrylate unit and an n-butyl acrylate unit.

From a viewpoint of even further improving adhesiveness of a functional layer formed using the obtained slurry composition and rate characteristics of a secondary battery, the proportional content of a (meth)acrylic acid alkyl ester monomer unit in the polymer of the core portion when the amount of all repeating units included in all polymer forming the organic particles having the core-shell structure (i.e., the total of the polymer of the core portion and the polymer of the shell portion in a case in which the organic particles are composed of only the core portion and the shell portion) is taken to be 100 mass % is preferably 40 mass % or more, more preferably 50 mass % or more, and even more preferably 60 mass % or more, and is preferably 90 mass % or less, more preferably 80 mass % or less, and even more preferably 70 mass % or less.

The polymer of the core portion preferably includes a hydrophilic group-containing monomer unit. Examples of hydrophilic group-containing monomers that can form a hydrophilic group-containing monomer unit include acidic group-containing monomers (for example, carboxy group-containing monomers, sulfo group-containing monomers, and phosphate group-containing monomers) and hydroxyl group-containing monomers. Note that one hydrophilic group-containing monomer may be used individually, or two or more hydrophilic group-containing monomers may be used in combination in a freely selected ratio.

Specific examples of acidic group-containing monomers include the same acidic group-containing monomers as given as examples in the "Single-polymer particles" section. Note that one acidic group-containing monomer may be used individually, or two or more acidic group-containing monomers may be used in combination in a freely selected ratio.

Examples of hydroxyl group-containing monomers include ethylenically unsaturated alcohols such as (meth) allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^a-COO-(C_qH_{2q}O)_p-H$ (where p represents an integer of 2 to 9, q represents an integer of 2 to 4, and $R^a$ represents a hydrogen atom or a methyl group); mono(meth) acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; (meth)allyl thioethers of alkylene glycols such as (meth)allyl-2-hydroxyethyl thioether and (meth)allyl-2-hydroxypropyl thioether; and hydroxyl group-containing amides such as N-hydroxymethylacrylamide (N-methylolacrylamide), N-hydroxymethylmethacrylamide, N-hydroxyethylacrylamide, and N-hydroxyethylmethacrylamide. Note that one hydroxyl group-containing monomer may be used individually, or two or more hydroxyl group-containing monomers may be used in combination in a freely selected ratio.

Of these hydrophilic group-containing monomers, acidic group-containing monomers are preferable from a viewpoint of further improving adhesiveness of a functional layer formed using the obtained slurry composition and rate characteristics of a secondary battery, with carboxy group-containing monomers being more preferable, acrylic acid, methacrylic acid, and itaconic acid more preferable, acrylic acid and methacrylic acid even more preferable, and methacrylic acid particularly preferable. In other words, the polymer of the core portion preferably includes an acidic group-containing monomer unit, more preferably includes a carboxy group-containing monomer unit, even more preferably includes at least one selected from the group consisting of an acrylic acid unit, a methacrylic acid unit, and an itaconic acid unit, particularly preferably includes either or both of an acrylic acid unit and a methacrylic acid unit, and most preferably includes a methacrylic acid unit.

From a viewpoint of even further improving adhesiveness of a functional layer formed using the obtained slurry composition and rate characteristics of a secondary battery, the proportional content of a hydrophilic group-containing monomer unit in the polymer of the core portion when the amount of all repeating units included in all polymer forming the organic particles having the core-shell structure (i.e., the total of the polymer of the core portion and the polymer of the shell portion in a case in which the organic particles are composed of only the core portion and the shell portion) is taken to be 100 mass % is preferably 0.5 mass % or more, more preferably 1 mass % or more, and even more preferably 2 mass % or more, and is preferably 10 mass % or less, more preferably 6 mass % or less, and even more preferably 4 mass % or less.

Moreover, the polymer of the core portion preferably includes a cross-linkable monomer unit. A cross-linkable monomer is a monomer that can form a cross-linked structure during or after polymerization by heating or by irradiation with energy rays. The inclusion of a cross-linkable monomer unit in the polymer of the core portion makes it easy to set the degree of swelling in electrolyte solution of the organic particles having a core-shell structure within a preferred range.

Examples of cross-linkable monomers that can be used include polyfunctional monomers having at least two groups that display polymerization reactivity in the monomer. Examples of such polyfunctional monomers include divinyl monomers such as divinylbenzene, 1,3-butadiene, isoprene, and allyl methacrylate; di(meth)acrylic acid ester monomers such as ethylene dimethacrylate, diethylene glycol dimethacrylate, ethylene glycol dimethacrylate, diethylene glycol diacrylate, and 1,3-butylene glycol diacrylate; tri(meth)acrylic acid ester monomers such as trimethylolpropane trimethacrylate and trimethylolpropane triacrylate; and ethylenically unsaturated monomers that include an epoxy group such as allyl glycidyl ether and glycidyl methacrylate. Of these examples, allyl methacrylate is preferable from a viewpoint that the degree of swelling in electrolyte solution of the organic particles can easily be controlled. Note that one cross-linkable monomer may be used individually, or two or more cross-linkable monomers may be used in combination in a freely selected ratio.

From a viewpoint of further improving adhesiveness of a functional layer formed using the obtained slurry composition and rate characteristics of a secondary battery, the proportional content of a cross-linkable monomer unit in the polymer of the core portion when the amount of all repeating units included in all polymer forming the organic particles having the core-shell structure (i.e., the total of the polymer of the core portion and the polymer of the shell portion in a case in which the organic particles are composed of only the core portion and the shell portion) is taken to be 100 mass % is preferably 0.01 mass % or more, more preferably 0.03 mass % or more, and even more preferably 0.05 mass % or more, and is preferably 2 mass % or less, more preferably 1 mass % or less, and even more preferably 0.5 mass % or less.

—Shell Portion—

Examples of monomers that can be used to produce a polymer of the shell portion include, but are not specifically limited to, the same monomers as given as examples of monomers that can be used to produce the polymer of the core portion. One of such monomers may be used individually, or two or more of such monomers may be used in combination in a freely selected ratio.

Of these monomers, the use of an aromatic monovinyl monomer as a monomer used to produce the polymer of the shell portion is preferable from a viewpoint of further improving adhesiveness of a functional layer formed using the obtained slurry composition and rate characteristics of a secondary battery. Specific examples of aromatic monovinyl monomers include the same aromatic monovinyl monomers as given as examples in the "Single-polymer particles" section. Of these aromatic monovinyl monomers, styrene is preferable. In other words, the polymer of the shell portion preferably includes an aromatic monovinyl monomer unit, and more preferably includes a styrene unit. Note that one aromatic monovinyl monomer may be used individually, or two or more aromatic monovinyl monomers may be used in combination in a freely selected ratio.

From a viewpoint of even further improving adhesiveness of a functional layer formed using the obtained slurry composition and rate characteristics of a secondary battery, the proportional content of an aromatic monovinyl monomer unit in the polymer of the shell portion when the amount of all repeating units included in all polymer forming the organic particles having the core-shell structure (i.e., the total of the polymer of the core portion and the polymer of the shell portion in a case in which the organic particles are composed of only the core portion and the shell portion) is taken to be 100 mass % is preferably 10 mass % or more, more preferably 15 mass % or more, and even more preferably 20 mass % or more, and is preferably 45 mass % or less, more preferably 40 mass % or less, and even more preferably 35 mass % or less.

Moreover, it is preferable that a hydrophilic group-containing monomer is used in addition to an aromatic monovinyl monomer such as described above in production of the polymer of the shell portion from a viewpoint of further improving adhesiveness of a functional layer formed using the obtained slurry composition and rate characteristics of a secondary battery. Specific examples of hydrophilic group-containing monomers include the same hydrophilic group-containing monomers as given as examples in the "Core portion" section. Of these hydrophilic group-containing monomers, methacrylic acid is preferable. In other words, the polymer of the shell portion preferably includes a hydrophilic group-containing monomer unit, and more preferably includes a methacrylic acid unit. Note that one hydrophilic group-containing monomer may be used individually, or two or more hydrophilic group-containing monomers may be used in combination in a freely selected ratio.

From a viewpoint of even further improving adhesiveness of a functional layer formed using the obtained slurry composition and rate characteristics of a secondary battery, the proportional content of a hydrophilic group-containing monomer unit in the polymer of the shell portion when the amount of all repeating units included in all polymer forming the organic particles having the core-shell structure (i.e., the total of the polymer of the core portion and the polymer of the shell portion in a case in which the organic particles are composed of only the core portion and the shell portion) is taken to be 100 mass % is preferably 0.05 mass % or more, more preferably 0.1 mass % or more, and even more preferably 0.3 mass % or more, and is preferably 5 mass % or less, more preferably 3 mass % or less, and even more preferably 2 mass % or less.

—Production Method of Organic Particles Having Core-Shell Structure—

The organic particles having the core-shell structure described above can be produced by, for example, performing stepwise polymerization of monomer for the polymer of the core portion and monomer for the polymer of the shell portion in which the ratio of these monomers is changed over time. Specifically, the organic particles having the core-shell structure can be produced by continuous, multi-step emulsion polymerization or multi-step suspension polymerization in which a polymer produced in a preceding step is sequentially covered by a polymer produced in a subsequent step.

The following describes one example of a case in which the organic particles having the core-shell structure are obtained by multi-step emulsion polymerization.

In the polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, or cumene peroxide, or an azo compound such as 2,2'-azobis(2-methyl-N-(2-hydroxyethyl)-propionamide) or 2,2'-azobis(2-amidinopropane) hydrochloride may be used as a polymerization initiator.

The polymerization procedure involves initially mixing monomers for forming the core portion and the emulsifier, and performing emulsion polymerization as one batch to obtain a particulate polymer that forms the core portion. Organic particles having the core-shell structure described above can then be obtained by performing polymerization of monomers for forming the shell portion in the presence of the particulate polymer forming the core portion.

In this polymerization, it is preferable that the monomers for forming the polymer of the shell portion are supplied into the polymerization system continuously or divided into a plurality of portions from a viewpoint of partially covering the outer surface of the core portion with the shell portion. As a result of the monomers for forming the polymer of the shell portion being supplied into the polymerization system in portions or continuously, the polymer forming the shell portion can be formed as particles that bond to the core portion such as to form a shell portion that partially covers the core portion.

<<Amount of Organic Particles>>

The slurry composition preferably contains 100 parts by mass or more, more preferably 300 parts by mass or more, even more preferably 500 parts by mass or more, and particularly preferably 1,000 parts by mass or more of the organic particles per 100 parts by mass, in total, of the subsequently described binder and melamine compound, and preferably contains 2,000 parts by mass or less, more preferably 1,600 parts by mass or less, and even more preferably 1,200 parts by mass or less of the organic particles per 100 parts by mass, in total, of the subsequently described binder and melamine compound. When the amount of the organic particles in the slurry composition is 100 parts by mass or more per 100 parts by mass, in total, of the binder and the melamine compound, rate characteristics of a secondary battery that includes a functional layer formed using the slurry composition can be further improved. On the other hand, when the amount of the organic particles in the slurry composition is 2,000 parts by mass or less per 100 parts by mass, in total, of the binder and the melamine compound, adhesiveness of a functional layer formed using the slurry composition can be further increased, and two adjacent battery members can closely adhere even more strongly via the functional layer.

<Binder>

In a functional layer formed on a substrate using the slurry composition, the binder holds components such as the organic particles set forth above such that these components do not become detached from the functional layer and enables adhesion of battery members via the functional layer. Note that the binder is preferably water-insoluble.

<<Type of Binder>>

The binder may be any binder that can be used inside a secondary battery without any specific limitations. For example, a polymer obtained through polymerization of a monomer composition containing a monomer that can display binding capacity (synthetic macromolecule such as an addition polymer obtained through addition polymerization) can be used as the binder. Examples of such polymers include an aliphatic conjugated diene/aromatic monovinyl copolymer (polymer including mainly an aliphatic conjugated diene monomer unit and an aromatic monovinyl monomer unit), an acrylic polymer (polymer including mainly a (meth)acrylic acid alkyl ester monomer unit), a fluoropolymer (polymer including mainly a fluorine-containing monomer unit), an acrylic acid/acrylamide copolymer (polymer including mainly a (meth)acrylic acid unit and a (meth)acrylamide unit), and an acrylonitrile polymer (polymer including mainly a (meth)acrylonitrile unit). One of these polymers may be used individually, or two or more of these polymers may be used in combination in a freely selected ratio. Of these polymers, an aliphatic conjugated diene/aromatic monovinyl copolymer, an acrylic acid/acrylamide copolymer, an acrylonitrile polymer, and an acrylic polymer are preferable, and an acrylic polymer is more preferable.

Examples of aliphatic conjugated diene monomers that can form an aliphatic conjugated diene monomer unit of the aliphatic conjugated diene/aromatic monovinyl copolymer, aromatic monovinyl monomers that can form an aromatic monovinyl monomer unit of the aliphatic conjugated diene/aromatic monovinyl copolymer, (meth)acrylic acid alkyl ester monomers that can form a (meth)acrylic acid alkyl ester monomer unit of the acrylic polymer, and fluorine-containing monomers that can form a fluorine-containing monomer unit of the fluoropolymer include known examples thereof (for example, any of the same aromatic monovinyl monomers and (meth)acrylic acid alkyl ester monomers as given as examples in the "Organic particles" section can be used).

Note that when a polymer is said to "mainly include" one type of monomer unit or a plurality of types of monomer units in the present disclosure, this means that "when the amount of all repeating units included in the polymer is taken to be 100 mass %, the proportional content of the one type of monomer unit or the total proportional content of the plurality of types of monomer units is more than 50 mass %".

<<Functional Group of Binder>>

The polymer used as the binder preferably includes a functional group. From a viewpoint of further improving adhesiveness of a functional layer and rate characteristics of a secondary battery, a carboxy group, a hydroxyl group, an amino group, an epoxy group, an oxazoline group, a sulfo group, a nitrile group, and an amide group (hereinafter, these functional groups are also referred to collectively as "prescribed functional groups") are preferable as functional groups included in the binder, and a carboxy group, a hydroxyl group, an amino group, an epoxy group, a nitrile group, and an amide group are more preferable as functional groups included in the binder. One of these types of functional groups may be used individually, or two or more of these types of functional groups may be used in combination in a freely selected ratio.

Note that in the case of a polymer including two or more types of functional groups, the polymer may be, but is not specifically limited to, a polymer including a carboxy group and a hydroxyl group; a polymer including a carboxy group and an amide group; a polymer including a carboxy group, a nitrile group, and an amino group; or a polymer including a carboxy group, an epoxy group, a hydroxyl group, and a nitrile group, for example.

No specific limitations are placed on the method by which a prescribed functional group is introduced into the polymer. A polymer that includes a prescribed functional group-containing monomer unit may be obtained by producing the polymer using a monomer that includes any of the prescribed functional groups set forth above (prescribed functional group-containing monomer), or a polymer that includes any of the prescribed functional groups set forth above at an end thereof may be obtained through end modification of any polymer, but the former of these methods is preferable. In other words, the polymer used as the binder preferably includes at least any one of a carboxy group-containing monomer unit, a hydroxyl group-containing monomer unit, an amino group-containing monomer unit, an epoxy group-containing monomer unit, an oxazoline group-containing monomer unit, a sulfo group-containing monomer unit, a nitrile group-containing monomer unit, and an amide group-containing monomer unit as a prescribed functional group-containing monomer unit, and more preferably includes at least any one of a carboxy group-containing monomer unit, a hydroxyl group-containing monomer unit, an amino group-containing monomer unit, an epoxy group-containing monomer unit, a nitrile group-containing monomer unit, and an amide group-containing monomer unit as a prescribed functional group-containing monomer unit.

In the case of a polymer that includes two or more types of prescribed functional group-containing monomer units, the polymer may, for example, be a polymer including a carboxy group-containing monomer unit and a hydroxyl group-containing monomer unit; a polymer including a carboxy group-containing monomer unit and an amide group-containing monomer unit; a polymer including a carboxy group-containing monomer unit, a nitrile group-containing monomer unit, and an amino group-containing monomer unit; or a polymer including a carboxy group-containing monomer unit, an epoxy group-containing monomer unit, a hydroxyl group-containing monomer unit, and a nitrile group-containing monomer unit.

Examples of carboxy group-containing monomers that can form a carboxy group-containing monomer unit include the same carboxy group-containing monomers as given as examples in the "Organic particles" section. Note that one carboxy group-containing monomer may be used individually, or two or more carboxy group-containing monomers may be used in combination in a freely selected ratio.

Examples of hydroxyl group-containing monomers that can form a hydroxyl group-containing monomer unit include the same hydroxyl group-containing monomers as given as examples in the "Organic particles" section. Note that one hydroxyl group-containing monomer may be used individually, or two or more hydroxyl group-containing monomers may be used in combination in a freely selected ratio.

Examples of amino group-containing monomers that can form an amino group-containing monomer unit include dimethylaminoethyl (meth)acrylate, diethylaminoethyl (meth)acrylate, aminoethyl vinyl ether, and dimethylaminoethyl vinyl ether. Note that one amino group-containing monomer may be used individually, or two or more amino group-containing monomers may be used in combination in a freely selected ratio.

Examples of epoxy group-containing monomers that can form an epoxy group-containing monomer unit include monomers that include a carbon-carbon double bond and an epoxy group.

Examples of monomers that include a carbon-carbon double bond and an epoxy group include unsaturated glycidyl ethers such as vinyl glycidyl ether, allyl glycidyl ether, butenyl glycidyl ether, and o-allylphenyl glycidyl ether; monoepoxides of dienes and polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid. Note that one epoxy group-containing monomer may be used individually, or two or more epoxy group-containing monomers may be used in combination in a freely selected ratio.

Examples of oxazoline group-containing monomers that can form an oxazoline group-containing monomer unit include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline. Note that one oxazoline group-containing monomer may be used individually, or two or more oxazoline group-containing monomers may be used in combination in a freely selected ratio.

Examples of sulfo group-containing monomers that can form a sulfo group-containing monomer unit include the same sulfo group-containing monomers as given as examples in the "Organic particles" section. Note that one sulfo group-containing monomer may be used individually, or two or more sulfo group-containing monomers may be used in combination in a freely selected ratio.

Examples of nitrile group-containing monomers that can form a nitrile group-containing monomer unit include α,β-ethylenically unsaturated nitrile monomers. Specifically, any α,β-ethylenically unsaturated compound that includes a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Note that one nitrile group-containing monomer may be used individually, or two or more nitrile group-containing monomers may be used in combination in a freely selected ratio.

Examples of amide group-containing monomers that can form an amide group-containing monomer unit include acrylamide and methacrylamide. Note that one amide group-containing monomer may be used individually, or two or more amide group-containing monomers may be used in combination in a freely selected ratio.

The proportional content of a prescribed functional group-containing monomer unit in the polymer serving as the binder when the amount of all repeating units included in the polymer is taken to be 100 mass % is preferably 0.3 mass % or more, more preferably 0.8 mass % or more, even more preferably 2 mass % or more, and particularly preferably 4 mass % or more, and is preferably 20 mass % or less, more preferably 10 mass % or less, and even more preferably 9 mass % or less. When the proportional content of a prescribed functional group-containing monomer unit in the polymer is within any of the ranges set forth above, adhesiveness of a functional layer and rate characteristics of a secondary battery can be further improved.

<<Production Method of Binder>>

No specific limitations are placed on the method by which the polymer serving as the binder is produced. For example, the polymer serving as the binder may be produced through polymerization of a monomer composition containing the monomers set forth above, carried out in an aqueous solvent. Note that the proportional content of each monomer in the monomer composition can be set in accordance with the desired proportional content of the monomer unit (repeating unit) in the polymer.

The method of polymerization is not specifically limited and can be any of solution polymerization, suspension polymerization, bulk polymerization, and emulsion polymerization, for example. Moreover, ionic polymerization, radical polymerization, living radical polymerization, various types of condensation polymerization, addition polymerization, and so forth can be adopted as the polymerization reaction. Furthermore, a known emulsifier and/or polymerization initiator can be used in the polymerization as necessary.

<<Properties of Binder>>

[Volume-Average Particle Diameter]

The volume-average particle diameter of the binder is preferably 100 nm or more, and is preferably 500 nm or less, more preferably less than 400 nm, and even more preferably 380 nm or less. When the volume-average particle diameter of the binder is 100 nm or more, adhesiveness of a functional layer formed using the slurry composition can be further increased, and two adjacent battery members can closely adhere even more strongly via the functional layer. On the other hand, when the volume-average particle diameter of the binder is 500 nm or less, rate characteristics of a secondary battery including a functional layer that is formed using the slurry composition can be further enhanced.

[Glass-Transition Temperature]

The glass-transition temperature of the binder is lower than 25° C., preferably 0° C. or lower, more preferably −20° C. or lower, and even more preferably −40° C. or lower. When the glass-transition temperature of the binder is 25° C. or higher, adhesiveness of a functional layer formed using the slurry composition cannot be ensured, and two adjacent battery members cannot closely adhere strongly via the functional layer. Although no specific limitations are placed on the lower limit for the glass-transition temperature of the binder, the glass-transition temperature of the binder is normally −100° C. or higher.

[Carboxy Group Content]

The amount of carboxy groups included in 1 g of the polymer serving as the binder (mmol/g; hereinafter, referred to as the "carboxy group content") is preferably 0.01 mmol/g or more, more preferably 0.1 mmol/g or more, even more preferably 0.2 mmol/g or more, further preferably 0.23 mmol/g or more, even further preferably 0.5 mmol/g or more, and particularly preferably 0.57 mmol/g or more, and is preferably 15 mmol/g or less, more preferably 10 mmol/g or less, even more preferably 9.69 mmol/g or less, further preferably 7 mmol/g or less, even further preferably 5 mmol/g or less, and particularly preferably 4.86 mmol/g or less. The binder and the melamine compound can be caused to sufficiently interact, and adhesiveness of an obtained functional layer can be further improved when the carboxy group content of the polymer serving as the binder is 0.01 mmol/g or more, whereas reduction of stability of the slurry composition can be prevented, and cycle characteristics of a secondary battery can be improved when the carboxy group content of the polymer is 15 mmol/g or less.

Note that the "carboxy group content" referred to in the present disclosure can be calculated from a charged amount (for example, the amount of a carboxy group-containing monomer that is used in production of the polymer serving as the binder) or can be calculated by measuring the acid content of the binder by titration.

[Nitrile Group Content]

The amount of nitrile groups included in 1 g of the polymer serving as the binder (mmol/g; hereinafter, referred to as the "nitrile group content") is preferably 1 mmol/g or more, more preferably 2 mmol/g or more, and even more preferably 2.57 mmol/g or more, and is preferably 40 mmol/g or less, more preferably 35 mmol/g or less, even more preferably 30 mmol/g or less, further preferably 21.6 mmol/g or less, even further preferably 15 mmol/g or less, particularly preferably 11.3 mmol/g or less, and most preferably 5 mmol/g or less. The binder and the melamine compound can be caused to sufficiently interact, and adhesiveness of an obtained functional layer can be further improved when the nitrile group content of the polymer serving as the binder is 1 mmol/g or more, whereas aggregation of the binder in the slurry composition can be prevented, and adequate rate characteristics of a secondary battery can be ensured when the nitrile group content of the polymer is 40 mmol/g or less.

Note that the "nitrile group content" referred to in the present disclosure can be calculated from a charged amount (for example, the amount of a nitrile group-containing monomer used in production of the polymer serving as the binder) or can be calculated through measurement of the nitrogen content in the binder by the modified Dumas method.

<Melamine Compound>

The melamine compound is a component that, through addition thereof to the slurry composition containing the binder, can improve binding capacity of the binder.

Examples of the "melamine compound" referred to in the present disclosure include melamine, derivatives of melamine, and salts thereof.

The melamine or derivative of melamine may be a compound represented by the following formula (I), for example.

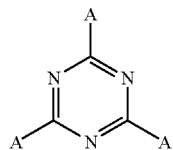

(I)

In formula (I), each A independently represents a hydroxyl group or —$NR^1R^2$. ($R^1$ and $R^2$ represent, independently of each another, a hydrogen atom, a hydrocarbon group, or a hydroxyl group-containing hydrocarbon group. In a case in which more than one 10 is present in formula (I), each $R^1$ may be the same or different, and in a case in which more than one $R^2$ is present in formula (I), each $R^2$ may be the same or different.)

Moreover, in the hydrocarbon group and the hydroxyl group-containing hydrocarbon group of 10 and $R^2$, one or more oxygen atoms (—O—) may be present between carbon atoms (however, in a case in which two or more oxygen atoms are present, these oxygen atoms are not adjacent). The number of carbon atoms in the hydrocarbon group and the hydroxyl group-containing hydrocarbon group of 10 and $R^2$ is preferably not less than 1 and not more than 5, but is not specifically limited thereto.

Moreover, examples of salts of melamine and derivatives of melamine include sulfates, cyanurates, and the like, but are not specifically limited thereto.

One melamine compound may be used individually, or two or more melamine compounds may be used in combination in a freely selected ratio. Of these melamine compounds, melamine, ammeline, ammelide, and salts thereof with cyanuric acid are preferable from a viewpoint of further enhancing adhesiveness of a functional layer and rate characteristics of a secondary battery, with melamine, ammeline, and a salt of melamine with cyanuric acid (melamine cyanurate) being more preferable.

<<Volume-Average Particle Diameter of Melamine Compound>>

The volume-average particle diameter of the melamine compound is preferably 50 nm or more, more preferably 100 nm or more, and even more preferably 120 nm or more, and is preferably 2.0 μm or less, more preferably 1.5 μm or less, and even more preferably 1.2 μm or less. When the volume-average particle diameter of the melamine compound is within any of the ranges set forth above, a secondary battery can be caused to display sufficiently good rate characteristics and cycle characteristics.

The volume-average particle diameter of the melamine compound can be determined as a particle diameter at which, in a particle diameter distribution (by volume) measured with respect to a water dispersion of the melamine compound having a solid content concentration of 0.1 mass % as a measurement sample using a dynamic light scattering particle diameter distribution analyzer (produced by Horiba, Ltd.; product name: SZ-100), the cumulative undersize calculated from a small diameter end of the distribution reaches 50%.

<<Quantitative Ratio of Binder and Melamine Compound>>

The proportion constituted by the melamine compound among the total of the binder and the melamine compound in the slurry composition is required to be not less than 0.5 mass % and not more than 85 mass %, is preferably 1 mass % or more, more preferably 5 mass % or more, even more preferably 15 mass % or more, particularly preferably 19 mass % or more, and most preferably 33 mass % or more, and is preferably 80 mass % or less, more preferably 50 mass % or less, even more preferably 44 mass % or less, and particularly preferably 40 mass % or less. When the proportion constituted by the melamine compound among the total of the binder and the melamine compound in the slurry composition is less than 0.5 mass %, adhesiveness of a functional layer decreases, and rate characteristics and cycle characteristics of a secondary battery deteriorate. On the other hand, when the proportion constituted by the melamine compound among the total of the binder and the melamine compound in the composition is more than 85 mass %, adhesiveness of a functional layer decreases.

<Solvent>

Any solvent in which the organic particles, the binder, and the melamine compound set forth above can be dissolved or dispersed can be used without any specific limitations as the solvent contained in the slurry composition, and either of water or an organic solvent can be used. Examples of organic solvents that can be used include acetonitrile, N-methyl-2-pyrrolidone, tetrahydrofuran, acetone, acetylpyridine, cyclopentanone, dimethylformamide, dimethyl sulfoxide, methylformamide, methyl ethyl ketone, furfural, ethylenediamine, dimethylbenzene (xylene), methylbenzene (toluene), cyclopentyl methyl ether, and isopropyl alcohol.

Note that one of these solvents may be used individually, or a plurality of these solvents may be used as a mixture in a freely selected mixing ratio.

<Other Components>

In addition to the organic particles, the binder, the melamine compound, and the solvent set forth above, the presently disclosed slurry composition may optionally contain known additives that can be added to functional layers such as other polymers differing from the organic particles and the binder in terms of chemical composition and properties, conductive materials, wetting agents, viscosity modifiers, and additives for electrolyte solution. Moreover, the presently disclosed slurry composition may contain a foaming agent such as sodium hydrogen carbonate and a flame retardant such as a phosphorus compound or a silicon compound from a viewpoint of improving secondary battery safety. One of these other components may be used individually, or two or more of these other components may be used in combination.

Note that the content of the foaming agent and the content of the flame retardant can each be set as 30 parts by mass or less or as 15 parts by mass or less per 100 parts by mass of the binder, for example.

Furthermore, the presently disclosed slurry composition may contain inorganic particles in order to improve heat resistance, strength, and so forth of a functional layer. Examples of inorganic particles include particles of oxides such as aluminum oxide (alumina), hydrous aluminum oxide (boehmite), silicon oxide, magnesium oxide (magnesia), calcium oxide, titanium oxide (titania), $BaTiO_3$, ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, and/or the like as necessary.

Note that one of these types of inorganic particles may be used individually, or two or more of these types of inorganic particles may be used in combination.

<Production Method of Slurry Composition>

The slurry composition can be produced without any specific limitations by mixing the above-described components. For example, the slurry composition can be produced by producing a binder composition containing the binder, the melamine compound, and the solvent, and subsequently adding the organic particles, and other components and additional solvent that are used as necessary to the obtained binder composition and performing mixing thereof.

<Functional Layer for Non-Aqueous Secondary Battery>

The presently disclosed functional layer is a layer that is formed from the presently disclosed slurry composition set forth above. For example, the presently disclosed functional layer can be formed by applying the slurry composition set forth above onto the surface of a suitable substrate to form a coating film, and subsequently drying the coating film that has been formed. In other words, the presently disclosed functional layer is formed of a dried product of the presently disclosed slurry composition set forth above and normally contains at least organic particles, a binder, and a melamine compound. Note that since components contained in the functional layer are components that were contained in the presently disclosed slurry composition set forth above, the preferred ratio of these components is the same as the preferred ratio of the components in the presently disclosed slurry composition. Also note that in a case in which a polymer such as the binder is a polymer that includes a cross-linkable functional group (for example, an epoxy group or an oxazoline group), the polymer may be cross-linked during drying of the slurry composition or during heat treatment or the like that is optionally implemented after drying (i.e., the functional layer may contain a cross-linked product of the previously described binder).

The presently disclosed functional layer has excellent adhesiveness and can cause a secondary battery including a battery member that includes the presently disclosed functional layer to display excellent battery characteristics (rate characteristics, etc.) as a result of the presently disclosed functional layer being formed from the presently disclosed slurry composition.

<<Substrate>>

No specific limitations are placed on the substrate onto which the slurry composition is applied. For example, a coating film of the slurry composition may be formed on the surface of a releasable substrate, the coating film may be dried to form a functional layer, and then the releasable substrate may be peeled from the functional layer. The functional layer that is peeled from the releasable substrate in this manner can be used as a free-standing film in formation of a battery member of a secondary battery.

However, it is preferable that a separator substrate or an electrode substrate is used as the substrate from a viewpoint of raising battery member production efficiency since a step of peeling the functional layer can be omitted.

[Separator Substrate]

The separator substrate is not specifically limited and may be a known separator substrate such as an organic separator substrate. The organic separator substrate is a porous member that is made from an organic material. The organic separator substrate may, for example, be a microporous membrane or non-woven fabric containing a polyolefin resin such as polyethylene or polypropylene, or an aromatic polyamide resin, and is preferably a microporous membrane or non-woven fabric made from polyethylene due to the excellent strength thereof.

[Electrode Substrate]

The electrode substrate (positive electrode substrate or negative electrode substrate) is not specifically limited and may be an electrode substrate that is obtained by forming an electrode mixed material layer containing electrode active material particles and a binder for an electrode mixed material layer on a current collector such as described above.

The electrode active material particles and the binder for an electrode mixed material layer that are contained in the electrode mixed material layer of the electrode substrate are not specifically limited and can be any of those described in WO2015/198530A1, for example. In addition, the electrode mixed material layer of the electrode substrate may contain a melamine compound.

<<Formation Method of Functional Layer>>

Examples of methods by which the functional layer may be formed on a substrate such as the separator substrate or the electrode substrate set forth above include:

(1) a method in which the presently disclosed slurry composition is applied onto the surface of a substrate (surface at the electrode mixed material layer side in the case of an electrode substrate; same applies below) and is then dried;

(2) a method in which a substrate is immersed in the presently disclosed slurry composition and is then dried; and (3) a method in which the presently disclosed slurry composition is applied onto a releasable substrate and is dried to form a functional layer that is then transferred onto the surface of a substrate.

Of these methods, method (1) is particularly preferable since it allows simple control of the thickness of the functional layer. In more detail, method (1) includes a step of applying the slurry composition onto a substrate (application step) and a step of drying the slurry composition that has been applied onto the substrate to form a functional layer (drying step).

[Application Step]

Examples of methods by which the slurry composition can be applied onto the substrate in the application step include, but are not specifically limited to, doctor blading, reverse roll coating, direct roll coating, gravure coating, extrusion coating, and brush coating.

[Drying Step]

The method by which the slurry composition on the substrate is dried in the drying step is not specifically limited and may be a commonly known method. Examples of drying methods that may be used include drying by warm, hot, or low-humidity air, drying in a vacuum, and drying through irradiation with infrared light, electron beams, or the like. The drying temperature is preferably lower than 200° C., and more preferably lower than 150° C. in order to avoid thermal decomposition and sublimation of the used melamine compound.

Note that the thickness of the functional layer produced as set forth above is preferably not less than 0.1 μm and not more than 10 μm from a viewpoint of ensuring strength of the functional layer while also further improving rate characteristics of a secondary battery.

(Battery Member Including Functional Layer)

By providing the presently disclosed functional layer set forth above on a separator substrate or an electrode substrate, it is possible to obtain a separator or an electrode (positive electrode or negative electrode) that serves as a battery member. Note that the functional layer may be included at one side of the substrate or may be included at both sides of the substrate. In the case of a separator serving as a battery member, for example, the presently disclosed functional layer can be included at one side or both sides (i.e., at least one side) of the separator substrate.

Moreover, a battery member (separator or electrode) that includes the presently disclosed functional layer may include constituent elements other than the presently disclosed functional layer set forth above and a substrate so long as the effects disclosed herein are not significantly lost. Examples of such constituent elements include, but are not specifically limited to, known functional layers (porous membrane layers, adhesive layers, etc.) that do not correspond to the presently disclosed functional layer.

A battery member that includes the presently disclosed functional layer (for example, a separator including a separator substrate and the presently disclosed functional layer or an electrode including an electrode substrate and the presently disclosed functional layer) can closely adhere well to an adjacent battery member and can cause a secondary battery to display excellent battery characteristics (for example, rate characteristics).

(Non-Aqueous Secondary Battery)

The presently disclosed secondary battery includes the presently disclosed functional layer set forth above. More specifically, the presently disclosed non-aqueous secondary battery includes a positive electrode, a negative electrode, a separator, and an electrolyte solution, and at least one battery member among the positive electrode, the negative electrode, and the separator includes the functional layer for a non-aqueous secondary battery set forth above. The presently disclosed secondary battery can display excellent battery characteristics (for example, rate characteristics).

<Positive Electrode, Negative Electrode, and Separator>

At least one of the positive electrode, the negative electrode, and the separator used in the presently disclosed secondary battery is a battery member that includes the presently disclosed functional layer set forth above. Note that in the case of a positive electrode, a negative electrode, or a separator that does not include the presently disclosed functional layer, known positive electrodes, negative electrodes, and separators can be used without any specific limitations.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents in the case of a lithium ion secondary battery, for example, include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Non-Aqueous Secondary Battery>

The presently disclosed secondary battery set forth above can be produced by, for example, stacking the positive electrode and the negative electrode with the separator in-between, performing rolling, folding, or the like of the resultant laminate as necessary to place the laminate in a battery container, injecting the electrolyte solution into the battery container, and sealing the battery container. Note that at least one member among the positive electrode, the negative electrode, and the separator is a battery member that includes the presently disclosed functional layer. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the following methods were used to measure and evaluate the volume-average particle diameters and glass-transition temperatures of organic particles and a binder, the degree of swelling in electrolyte solution of organic particles, the adhesiveness of a functional layer, the close adherence strength of an electrode and a separator via a functional layer, and the rate characteristics and cycle characteristics of a secondary battery.

<Volume-Average Particle Diameter>

The volume-average particle diameters of organic particles and a binder were measured as follows by laser diffraction. First, a water dispersion containing the organic particles and a water dispersion containing the binder that had been produced were each adjusted to a solid content concentration of 0.1 mass % to prepare measurement samples. A particle diameter distribution (by volume) was then measured using a laser diffraction particle diameter distribution analyzer (produced by Beckman Coulter, Inc.; product name: LS-13 320), and the particle diameter D50 at which cumulative volume calculated from the small diameter end of the particle diameter distribution reached 50% was taken to be the volume-average particle diameter.

<Glass-Transition Temperature>

First, a water dispersion containing organic particles and a water dispersion containing a binder that had been produced were each dried at a temperature of 25° C. for 48 hours, and the resultant powder was taken to be a measurement sample.

Next, 10 mg of the measurement sample was weighed into an aluminum pan and was measured by a differential scanning calorimeter (produced by SII NanoTechnology Inc.; product name: EXSTAR DSC6220) under conditions prescribed by JIS Z8703 with a measurement temperature range of −100° C. to 200° C. and a heating rate of 20° C./min to obtain a differential scanning calorimetry (DSC) curve. An empty aluminum pan was used as a reference. In the heating process, the temperature at which a derivative signal (DDSC) displayed a peak was determined as the glass-transition temperature (° C.). Note that in a case in which more than one peak was measured (for example, in glass-transition temperature measurement of organic particles having a core-shell structure), the temperature indicated by a peak having the largest displacement was taken to be the glass-transition temperature of the organic particles or the binder.

<Degree of Swelling in Electrolyte Solution>

A water dispersion containing organic particles was loaded into a petri dish made from polytetrafluoroethylene. The water dispersion in the petri dish was dried at a temperature of 25° C. for 48 hours to obtain a powdered sample. Approximately 0.2 g of the sample was pressed at a temperature of 200° C. and a pressure of 5 MPa for 2 minutes to obtain a test specimen. The weight of the obtained test specimen was measured and was taken to be W0.

Next, the obtained test specimen was immersed in electrolyte solution having a temperature of 60° C. for 72 hours. The electrolyte solution was a solution containing $LiPF_6$ of 1 M in concentration as a supporting electrolyte in a mixed solvent of ethylene carbonate (EC), diethyl carbonate (DEC), and vinylene carbonate (VC) (volume mixing ratio: EC/DEC/VC=68.5/30/1.5).

After this immersion, the test specimen was removed from the electrolyte solution, and electrolyte solution on the surface of the test specimen was wiped off. The weight of the test specimen after immersion was measured and was taken to be W1. The measured weights W0 and W1 were used to calculate the degree of swelling in electrolyte solution S (mass %) by:

$$S=(W1/W0)\times 100.$$

Adhesiveness

Examples 1 to 8 and Comparative Examples 1 and 2

A produced separator including a functional layer (separator including functional layer at one side) was cut out as a rectangle of 100 mm in length and 10 mm in width to obtain a test specimen, was placed with the surface at which the functional layer was present facing downward, and the surface of the functional layer of the test specimen was affixed to a test stage (base plate made from SUS) via cellophane tape (tape prescribed by JIS Z1522). Thereafter, the stress (N/m) when the separator substrate was peeled off by pulling one end of the separator substrate in a perpendicular direction at a pulling speed of 50 mm/min was measured. (Note that the cellophane tape was secured to the test stage.) A total of three measurements were performed in this manner to determine an average value that was taken to be first peel strength and was evaluated by the following standard. A larger value for the first peel strength indicates that the functional layer and the separator substrate are closely adhered more strongly, and that the functional layer has better adhesiveness.

A: First peel strength of 40.0 N/m or more
B: First peel strength of not less than 30.0 N/m and less than 40.0 N/m
C: First peel strength of not less than 20.0 N/m and less than 30.0 N/m
D: First peel strength of less than 20.0 N/m Example 9 and Comparative Example 3

A produced positive electrode including a functional layer at one side was cut out as a rectangle of 100 mm in length and 10 mm in width to obtain a test specimen, was placed with the surface at which the functional layer was present facing downward, and the surface of the functional layer of the test specimen was affixed to a test stage (base plate made from SUS) via cellophane tape (tape prescribed by JIS Z1522). Thereafter, the stress (N/m) when the current collector was peeled off by pulling one end of the current collector in a perpendicular direction at a pulling speed of 50 mm/min was measured. (Note that the cellophane tape was secured to the test stage.) A total of three measurements were performed in this manner.

Separately to the above, a produced negative electrode including a functional layer at one side was cut out as a rectangle of 100 mm in length and 10 mm in width to obtain a test specimen, and stress measurement was performed a total of three times in the same manner as when the positive electrode was used. An average value of the total of six stress measurements for the positive electrode and the negative electrode was determined and was evaluated as first peel strength by the following standard. A larger value for the first peel strength indicates that the functional layer and the electrode mixed material layer (electrode substrate) are closely adhered more strongly, and that the functional layer has better adhesiveness.

A: First peel strength of 15.0 N/m or more
B: First peel strength of not less than 10.0 N/m and less than 15.0 N/m
C: First peel strength of not less than 5.0 N/m and less than 10.0 N/m
D: First peel strength of less than 5.0 N/m Close Adherence Strength Examples 1 to 8 and Comparative Examples 1 and 2

A produced positive electrode (positive electrode including mixed material layer at one side) and separator (separator including functional layers at both sides) were each cut to 50 mm in length and 10 mm in width. Next, the positive electrode and the separator that had been cut were stacked with the positive electrode mixed material layer of the positive electrode and the separator in contact to obtain a laminate. The obtained laminate was pressed at a pressing rate of 30 m/min by roll pressing with a temperature of 70° C. and a load of 10 kN/m to obtain a test specimen.

The test specimen was placed with the surface at the current collector side of the positive electrode facing downward, and cellophane tape (tape prescribed by JIS Z1522) was affixed to the surface at the current collector side of the positive electrode. Note that the cellophane tape was secured to a horizontal test stage in advance. The stress when the separator was peeled off by pulling one end of the separator vertically upward at a pulling speed of 50 mm/min was measured. A total of three measurements were made in this manner. Separately to the above, a produced negative electrode (negative electrode including mixed material layer at one side) and separator (separator including functional layers at both sides) were each cut to 50 mm in length and 10 mm in width. A test specimen was obtained, and stress measurement was performed a total of three times in the same manner as when the positive electrode was used.

An average value of the total of six stress measurements obtained using the positive electrode and the negative electrode was determined as second peel strength (N/m), and close adherence strength of an electrode and a separator via a functional layer was evaluated by the following standard. A larger value for the second peel strength indicates that an electrode and a separator can closely adhere more strongly via a functional layer.

A: Second peel strength of 10.0 N/m or more
B: Second peel strength of not less than 7.0 N/m and less than 10.0 N/m
C: Second peel strength of not less than 5.0 N/m and less than 7.0 N/m
D: Second peel strength of not less than 2.0 N/m and less than 5.0 N/m
E: Second peel strength of less than 2.0 N/m Example 9 and Comparative Example 3

A produced positive electrode (positive electrode including functional layers at both sides) and separator (separator not including functional layer) were each cut to 50 mm in length and 10 mm in width. Next, the positive electrode and the separator that had been cut were stacked to obtain a laminate. The obtained laminate was pressed at a pressing rate of 30 m/min by roll pressing with a temperature of 70° C. and a load of 10 kN/m to obtain a test specimen.

The test specimen was placed with the positive electrode side thereof facing downward, and cellophane tape (tape prescribed by JIS Z1522) was affixed to the lower surface of the positive electrode. Note that the cellophane tape was secured to a horizontal test stage in advance. The stress when the separator was peeled off by pulling one end of the separator vertically upward at a pulling speed of 50 mm/min was measured. A total of three measurements were made in this manner.

Separately to the above, a produced negative electrode (negative electrode including functional layers at both sides) and separator (separator not including functional layer) were each cut to 50 mm in length and 10 mm in width. A test specimen was obtained, and stress measurement was performed a total of three times in the same manner as when the positive electrode was used.

An average value of the total of six stress measurements obtained using the positive electrode and the negative electrode was determined as second peel strength (N/m), and close adherence strength of an electrode and a separator via a functional layer was evaluated by the following standard. A larger value for the second peel strength indicates that an electrode and a separator can closely adhere more strongly via a functional layer.

A: Second peel strength of 10.0 N/m or more
B: Second peel strength of not less than 7.0 N/m and less than 10.0 N/m
C: Second peel strength of not less than 5.0 N/m and less than 7.0 N/m
D: Second peel strength of not less than 2.0 N/m and less than 5.0 N/m
E: Second peel strength of less than 2.0 N/m <Rate Characteristics>

A produced lithium ion secondary battery was left at rest at a temperature of 25° C. for 5 hours after injection of electrolyte solution. Next, the lithium ion secondary battery was charged to a cell voltage of 3.65 V by a 0.2 C constant-current method at a temperature of 25° C. and was then subjected to 12 hours of aging at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage: 4.35 V) and CC discharging of the lithium ion secondary battery was performed to a cell voltage of 3.00 V with a 0.2 C constant current. This charging and discharging at 0.2 C was repeated three times.

Next, the lithium ion secondary battery was subjected to 0.2 C constant-current charging and discharging between cell voltages of 4.20 V and 3.00 V in an environment having a temperature of 25° C., and the discharge capacity at this time was defined as C0. Thereafter, the lithium ion secondary battery was CC-CV charged with a 0.2 C constant current in the same manner and was then discharged to 2.5 V with a 0.5 C constant current in an environment having a temperature of −10° C., and the discharge capacity at this time was defined as C1. A capacity maintenance rate expressed by $\Delta C=(C1/C0)\times100(\%)$ was determined as a rate characteristic and was evaluated by the following standard. A larger value for the capacity maintenance rate $\Delta C$ indicates higher discharge capacity at high current in low-temperature environments and lower internal resistance.

A: Capacity maintenance rate $\Delta C$ of 70% or more
B: Capacity maintenance rate $\Delta C$ of not less than 65% and less than 70%
C: Capacity maintenance rate $\Delta C$ of not less than 60% and less than 65%
D: Capacity maintenance rate $\Delta C$ of less than 60%

<Cycle Characteristics>

A produced lithium ion secondary battery was left at rest at a temperature of 25° C. for 24 hours after injection of electrolyte solution. Thereafter, the lithium ion secondary battery was subjected to a charge/discharge operation of charging to 4.35 V by a constant-voltage constant-current (CC-CV) method at a charge rate of 1 C (cut-off condition: 0.02 C) and discharging to 3.0 V by a constant-current (CC) method at a discharge rate of 1C at a temperature of 25° C., and the initial capacity C2 was measured.

The lithium ion secondary battery was also repeatedly subjected to the same charge/discharge operation in a 45° C. environment, and the capacity C3 after 300 cycles was measured. The capacity maintenance rate $\Delta C'=(C3/C2)\times100$ (%) was calculated and was evaluated by the following standard. A higher value for the capacity maintenance rate $\Delta C'$ indicates a smaller decrease of discharge capacity and better cycle characteristics.

A: Capacity maintenance rate ΔC' of 85% or more
B: Capacity maintenance rate ΔC' of not less than 80% and less than 85%
C: Capacity maintenance rate ΔC' of not less than 75% and less than 80%
D: Capacity maintenance rate ΔC' of less than 75%

Example 1

<Production of Organic Particles (Core-Shell Structure)>

In core portion formation, a 5 MPa pressure vessel equipped with a stirrer was charged with 38.5 parts of methyl methacrylate and 28.6 parts of n-butyl acrylate as (meth)acrylic acid alkyl ester monomers, 0.1 parts of allyl methacrylate as a cross-linkable monomer, 2.8 parts of methacrylic acid as an acidic group-containing monomer, 1 part of sodium dodecylbenzenesulfonate as an emulsifier, 150 parts of deionized water, and 0.5 parts of potassium persulfate as a polymerization initiator. These materials were sufficiently stirred and were then heated to 60° C. to initiate polymerization. Polymerization was continued until the polymerization conversion rate reached 96% to yield a water dispersion containing a particulate polymer forming a core portion. Next, at the point at which the polymerization conversion rate reached 96%, 29.5 parts of styrene as an aromatic monovinyl monomer and 0.5 parts of methacrylic acid as an acidic group-containing monomer were continuously added for shell portion formation, heating was performed to 70° C., and polymerization was continued until the conversion rate reached 96%, at which point, cooling was performed to quench the reaction to yield a water dispersion containing organic particles. The obtained organic particles were water-insoluble and had a core-shell structure in which a shell portion partially covered an outer surface of a core portion.

The volume-average particle diameter, glass-transition temperature, and degree of swelling in electrolyte solution of the obtained organic particles were measured, and the results thereof are shown in Table 1.

<Production of Binder (Polymer A)>

A reactor including a stirrer was charged with 70 parts of deionized water, 0.15 parts of sodium lauryl sulfate (produced by Kao Corporation; product name: EMAL 2F) as an emulsifier, and 0.5 parts of ammonium persulfate, the gas phase was purged with nitrogen gas, and heating was performed to 60° C.

Meanwhile, a monomer composition was obtained in a separate vessel by mixing 50 parts of deionized water, 0.5 parts of sodium dodecylbenzenesulfonate as an emulsifier, 94 parts of n-butyl acrylate as a (meth)acrylic acid alkyl ester monomer, 2 parts of acrylonitrile as a nitrile group-containing monomer, 2 parts of methacrylic acid as a carboxy group-containing monomer, 1 part of N-hydroxymethylacrylamide as a hydroxyl group-containing monomer, and 1 part of allyl glycidyl ether as an epoxy group-containing monomer. The monomer composition was continuously added into the reactor over 4 hours to carry out polymerization. The reaction was carried out at 60° C. during the addition. Once this addition was completed, a further 3 hours of stirring was performed at 70° C. to complete the reaction and yield a water dispersion containing a polymer A (water-insoluble) as a binder.

The volume-average particle diameter and glass-transition temperature of the obtained binder were measured. The results are shown in Table 1. Moreover, the carboxy group content and nitrile group content of the obtained binder were respectively calculated from the charged amount of methacrylic acid as a carboxy group-containing monomer and the charged amount of acrylonitrile as a nitrile group-containing monomer. The results are shown in Table 1.

<Production of Slurry Composition for Non-Aqueous Secondary Battery Functional Layer>

A binder composition was produced by mixing 67 parts (in terms of solid content) of the water dispersion of the polymer A and 33 parts of melamine cyanurate as a melamine compound. Next, 1,000 parts (in terms of solid content) of the water dispersion of the organic particles obtained as described above and a wetting agent (produced by Kao Corporation; product name: EMULGEN® 120 (EMULGEN is a registered trademark in Japan, other countries, or both)) were added to 100 parts (in terms of solid content) of the binder composition and were mixed therewith inside a stirring vessel to obtain a mixture. The obtained mixture was diluted with deionized water to obtain a slurry composition (solid content concentration: 10%).

<Production of Separator Including Functional Layer>

The slurry composition obtained as described above was applied onto a separator substrate made from polypropylene (produced by Celgard, LLC.; product name: Celgard® 2500 (Celgard is a registered trademark in Japan, other countries, or both)) and was dried at a temperature of 50° C. for 3 minutes to obtain a separator including a functional layer at one side of the separator substrate (separator including functional layer at one side). The separator (separator including functional layer at one side) was used to evaluate functional layer adhesiveness. The result is shown in Table 1.

Separately to the above, the above-described application and drying operations were performed with respect to both sides of a separator substrate to obtain a separator including functional layers at both sides of the separator substrate (separator including functional layers at both sides). This separator (separator including functional layers at both sides) and a negative electrode (negative electrode including mixed material layer at one side) and positive electrode (positive electrode including mixed material layer at one side) obtained as described below were used to evaluate close adherence strength of an electrode and a separator via a functional layer. The result is shown in Table 1.

<Production of Negative Electrode>

A 5 MPa pressure vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The polymerization reaction was quenched by cooling at the point at which the polymerization conversion rate reached 96% to yield a mixture containing a particulate binder (styrene-butadiene copolymer).

The mixture was adjusted to pH 8 through addition of 5% sodium hydroxide aqueous solution and was then subjected to thermal-vacuum distillation to remove unreacted monomer. Thereafter, the mixture was cooled to 30° C. or lower to obtain a water dispersion containing a binder for a negative electrode mixed material layer.

Next, a mixture containing 100 parts of artificial graphite (volume-average particle diameter: 15.6 μm) as a negative electrode active material and 1 part in terms of solid content of a 2% aqueous solution of carboxymethyl cellulose sodium salt (produced by Nippon Paper Industries Co., Ltd.; product name: MAC350HC) as a thickener was adjusted to a solid content concentration of 68% with deionized water and was then mixed at 25° C. for 60 minutes. The solid content concentration was then adjusted to 62% with deionized water, and then a further 15 minutes of mixing was performed at 25° C. to obtain a mixture. Deionized water and 1.5 parts in terms of solid content of the water dispersion containing the binder for a negative electrode mixed material layer described above were added to the obtained mixture, the final solid content concentration was adjusted to 52%, and a further 10 minutes of mixing was performed. The resultant mixture was subjected to a defoaming process under reduced pressure to yield a slurry composition for a negative electrode having good fluidity.

The slurry composition for a negative electrode obtained as described above was applied onto one side of copper foil (thickness: 20 μm) serving as a current collector using a comma coater such as to have a thickness after drying of approximately 150 μm. The slurry composition was dried by conveying the coated copper foil inside a 60° C. oven for 2 minutes at a speed of 0.5 m/min. Thereafter, 2 minutes of heat treatment was performed at 120° C. to obtain a pre-pressing negative electrode web. The pre-pressing negative electrode web was rolled by roll pressing to obtain a negative electrode including a negative electrode mixed material layer (thickness: 80 μm) at one side of the current collector (negative electrode including mixed material layer at one side).

Separately to the above, the slurry composition for a negative electrode obtained as described above was applied onto both sides of copper foil (thickness: 20 μm) serving as a current collector using a comma coater such as to have a thickness after drying of approximately 150 μm at each side. The slurry composition was dried by conveying the coated copper foil inside a 60° C. oven for 2 minutes at a speed of 0.5 m/min. Thereafter, 2 minutes of heat treatment was performed at 120° C. to obtain a pre-pressing negative electrode web. The pre-pressing negative electrode web was rolled by roll pressing to obtain a negative electrode including negative electrode mixed material layers (thickness of each layer: 80 μm) at both sides of the current collector (negative electrode including mixed material layers at both sides).

<Production of Positive Electrode>

A mixture adjusted to a total solid content concentration of 70% was obtained by mixing 100 parts of $LiCoO_2$ (volume-average particle diameter: 12 μm) as a positive electrode active material, 2 parts of acetylene black (produced by Denka Company Limited; product name: HS-100) as a conductive material, and 2 parts in terms of solid content of polyvinylidene fluoride (produced by Kureha Corporation; product name: #7208) as a binder for a positive electrode mixed material layer with N-methylpyrrolidone as a solvent. The obtained mixture was mixed using a planetary mixer to obtain a slurry composition for a positive electrode.

The slurry composition for a positive electrode obtained as described above was applied onto one side of aluminum foil (thickness: 20 μm) serving as a current collector using a comma coater such as to have a thickness after drying of approximately 150 μm. The slurry composition was dried by conveying the aluminum foil inside a 60° C. oven for 2 minutes at a speed of 0.5 m/min. Thereafter, 2 minutes of heat treatment was performed at 120° C. to obtain a pre-pressing positive electrode web. The pre-pressing positive electrode web was rolled by roll pressing to obtain a positive electrode including a positive electrode mixed material layer (thickness: 80 μm) at one side of the current collector (positive electrode including mixed material layer at one side).

Separately to the above, the slurry composition for a positive electrode obtained as described above was applied onto both sides of aluminum foil (thickness: 20 μm) serving as a current collector using a comma coater such as to have a thickness after drying of approximately 150 μm at each side. The slurry composition was dried by conveying the coated aluminum foil inside a 60° C. oven for 2 minutes at a speed of 0.5 m/min. Thereafter, 2 minutes of heat treatment was performed at 120° C. to obtain a pre-pressing positive electrode web. The pre-pressing positive electrode web was rolled by roll pressing to obtain a positive electrode including positive electrode mixed material layers (thickness of each layer: 80 μm) at both sides of the current collector (positive electrode including mixed material layers at both sides).

<Production of Secondary Battery>

Positive electrodes were cut out as 5 cm×5 cm from the positive electrode obtained as described above (positive electrode including mixed material layers at both sides), separators were cut out as 5.5 cm×5.5 cm from the separator obtained as described above (separator including functional layers at both sides), and negative electrodes were cut out as 5.2 cm×5.2 cm from the negative electrode obtained as described above (negative electrode including mixed material layers at both sides) so as to prepare 10 positive electrodes, 22 separators, and 11 negative electrodes. Of these battery members, 10 positive electrodes, 10 separators, and 10 negative electrodes were used to prepare 10 pre-laminates (negative electrode/separator/positive electrode) through stacking in an order of negative electrode/separator/positive electrode (three battery members in total (one of each)) and pressing at 90° C. and 2 MPa for 5 seconds. Next, the 10 pre-laminates that were obtained and 11 separators (separators including functional layers at both sides) were stacked alternately, one negative electrode and one separator were further stacked, and then pressing was performed at 90° C. and 2 MPa for 5 seconds to obtain a laminate (separator/negative electrode/separator/positive electrode/separator/negative electrode/separator/positive electrode/separator . . . negative electrode/separator/positive electrode/separator/negative electrode/separator).

Next, the laminate was enclosed in an aluminum packing case serving as a battery case, and electrolyte solution was injected such that no air remained. The electrolyte solution was a solution containing $LiPF_6$ of 1 M in concentration as a supporting electrolyte in a mixed solvent of ethylene carbonate (EC), diethyl carbonate (DEC), and vinylene carbonate (VC) (volume mixing ratio: EC/DEC/VC=68.5/30/1.5). An opening of the aluminum packing case was heat sealed at 150° C. to seal closed the aluminum packing case and thereby produce a lithium ion secondary battery having a capacity of 800 mAh. The rate characteristics and cycle characteristics of the obtained lithium ion secondary battery were evaluated. The results are shown in Table 1.

Examples 2 and 3

Organic particles, a binder, a slurry composition for a non-aqueous secondary battery functional layer, a separator including a functional layer, a negative electrode, a positive electrode, and a secondary battery were produced, and various evaluations were performed in the same way as in Example 1 with the exception that in production of the slurry composition for a non-aqueous secondary battery functional layer, ammeline (Example 2) or melamine (Example 3) was used instead of melamine cyanurate. The results are shown in Table 1.

Examples 4 and 5

Organic particles, a binder, a slurry composition for a non-aqueous secondary battery functional layer, a separator including a functional layer, a negative electrode, a positive electrode, and a secondary battery were produced, and various evaluations were performed in the same way as in Example 1 with the exception that in production of the slurry composition for a non-aqueous secondary battery functional layer, the amounts of the binder and melamine cyanurate were changed as shown in Table 1. The results are shown in Table 1.

Example 6

Organic particles, a binder, a slurry composition for a non-aqueous secondary battery functional layer, a separator including a functional layer, a negative electrode, a positive electrode, and a secondary battery were produced, and various evaluations were performed in the same way as in Example 1 with the exception that in production of the organic particles (core-shell structure), the amount of methyl methacrylate was changed from 38.5 parts to 42.6 parts and the amount of n-butyl acrylate was changed from 28.6 parts to 24.5 parts. The results are shown in Table 1.

Example 7

Organic particles, a binder, a slurry composition for a non-aqueous secondary battery functional layer, a separator including a functional layer, a negative electrode, a positive electrode, and a secondary battery were produced, and various evaluations were performed in the same way as in Example 1 with the exception that in production of the organic particles (core-shell structure), the amount of methyl methacrylate was changed from 38.5 parts to 37.9 parts and the amount of allyl methacrylate was changed from 0.1 parts to 0.7 parts. The results are shown in Table 2.

Example 8

A binder, a slurry composition for a non-aqueous secondary battery functional layer, a separator including a functional layer, a negative electrode, a positive electrode, and a secondary battery were produced, and various evaluations were performed in the same way as in Example 1 with the exception that the organic particles (core-shell structure) used in production of the slurry composition for a non-aqueous secondary battery functional layer were changed to organic particles (single-polymer particles) produced as described below. The results are shown in Table 2.
<Production of Organic Particles (Single-Polymer Particles)>
A 5 MPa pressure vessel equipped with a stirrer was charged with 75 parts of styrene as an aromatic monovinyl monomer, 20 parts of n-butyl acrylate as a (meth)acrylic acid alkyl ester monomer, 4 parts of methacrylic acid as an acidic group-containing monomer, 1 part of ethylene glycol dimethacrylate as a polyvalent ethylenically unsaturated crosslinkable monomer, 1 part of sodium dodecylbenzenesulfonate as an emulsifier, 150 parts of deionized water, and 0.5 parts of potassium persulfate as a polymerization initiator. These materials were sufficiently stirred and were then heated to 60° C. to initiate polymerization. At the point at which the polymerization conversion rate reached 96%, the reaction medium was cooled to quench the polymerization reaction to yield a water dispersion containing organic particles. Note that the obtained organic particles were water-insoluble.

Example 9

<Production of Organic Particles (Core-Shell Structure)>
A water dispersion containing organic particles was obtained in the same way as in Example 1.
<Production of Binder (Polymer A)>
A water dispersion containing a binder was obtained in the same way as in Example 1.
<Production of Slurry Composition for Non-Aqueous Secondary Battery Functional Layer>
A slurry composition was obtained in the same way as in Example 1.
<Production of Positive Electrode Including Functional Layer>
A positive electrode including a positive electrode mixed material layer at one side of a current collector was produced in the same way as in Example 1. The slurry composition obtained as described above was applied onto this positive electrode, which served as a positive electrode substrate, and was dried at a temperature of 50° C. for 3 minutes. The resultant positive electrode (positive electrode including functional layer at one side) was used to evaluate functional layer adhesiveness. The result is shown in Table 2.

In addition, a positive electrode including positive electrode mixed material layers at both sides of a current collector was produced in the same way as in Example 1. This positive electrode was used as a positive electrode substrate, and the slurry composition obtained as described above was applied onto one side of the positive electrode substrate and was dried at a temperature of 50° C. for 3 minutes. Next, the slurry composition obtained as described above was also applied onto the other side of the positive electrode substrate and was dried at a temperature of 50° C. for 3 minutes to obtain a positive electrode including functional layers of 1 μm each in thickness at both sides of the positive electrode substrate (positive electrode including functional layers at both sides). This positive electrode (positive electrode including functional layers at both sides) and a negative electrode (negative electrode including functional layers at both sides) and separator obtained as described below were used to evaluate close adherence strength of an electrode and a separator via a functional layer. The result is shown in Table 2.
<Production of Negative Electrode Including Functional Layer>
A negative electrode including a negative electrode mixed material layer at one side of a current collector was produced in the same way as in Example 1. The slurry composition obtained as described above was applied onto this negative electrode, which served as a negative electrode substrate, and was dried at a temperature of 50° C. for 3 minutes. The resultant negative electrode (negative electrode including functional layer at one side) was used to evaluate functional layer adhesiveness. The result is shown in Table 2.

In addition, a negative electrode including negative electrode mixed material layers at both sides of a current collector was produced in the same way as in Example 1. This negative electrode was used as a negative electrode substrate, and the slurry composition obtained as described above was applied onto one side of the negative electrode substrate and was dried at a temperature of 50° C. for 3 minutes. Next, the slurry composition obtained as described above was also applied onto the other side of the negative electrode substrate and was dried at a temperature of 50° C. for 3 minutes to obtain a negative electrode including functional layers of 1 μm each in thickness at both sides of the negative electrode substrate (negative electrode including functional layers at both sides).

<Preparation of Separator>

A separator substrate made from polypropylene (produced by Celgard, LLC.; product name: Celgard 2500) was prepared.

<Production of Secondary Battery>

Positive electrodes were cut out as 5 cm×5 cm from the positive electrode obtained as described above (positive electrode including functional layers at both sides), separators were cut out as 5.5 cm×5.5 cm from the separator obtained as described above, and negative electrodes were cut out as 5.2 cm×5.2 cm from the negative electrode obtained as described above (negative electrode including functional layers at both sides) so as to prepare 10 positive electrodes, 22 separators, and 11 negative electrodes. Of these battery members, 10 positive electrodes, 10 separators, and 10 negative electrodes were used to prepare 10 pre-laminates (negative electrode/separator/positive electrode) through stacking in an order of negative electrode/separator/positive electrode (three battery members in total (one of each)) and pressing at 90° C. and 2 MPa for 5 seconds. Next, the 10 pre-laminates that were obtained and 11 separators (separators including functional layers at both sides) were stacked alternately, one negative electrode and one separator were further stacked, and then pressing was performed at 90° C. and 2 MPa for 5 seconds to obtain a laminate (separator/negative electrode/separator/positive electrode/separator/negative electrode/separator/positive electrode/separator . . . negative electrode/separator/positive electrode/separator/negative electrode/separator).

Next, the laminate was enclosed in an aluminum packing case serving as a battery case, and electrolyte solution was injected such that no air remained. The electrolyte solution was a solution containing LiPF$_6$ of 1 M in concentration as a supporting electrolyte in a mixed solvent of ethylene carbonate (EC), diethyl carbonate (DEC), and vinylene carbonate (VC) (volume mixing ratio: EC/DEC/VC=68.5/30/1.5). An opening of the aluminum packing case was heat sealed at 150° C. to seal closed the aluminum packing case and thereby produce a lithium ion secondary battery having a capacity of 800 mAh. The rate characteristics and cycle characteristics of the obtained lithium ion secondary battery were evaluated. The results are shown in Table 2.

Comparative Example 1

Organic particles, a binder, a slurry composition for a non-aqueous secondary battery functional layer, a separator including a functional layer, a negative electrode, a positive electrode, and a secondary battery were produced, and various evaluations were performed in the same way as in Example 1 with the exception that in production of the slurry composition for a non-aqueous secondary battery functional layer, melamine cyanurate was not used, and the amount of the binder (polymer A) was set as 100 parts. The results are shown in Table 2.

Comparative Example 2

Organic particles, a binder, a slurry composition for a non-aqueous secondary battery functional layer, a separator including a functional layer, a negative electrode, a positive electrode, and a secondary battery were produced, and various evaluations were performed in the same way as in Example 8 with the exception that in production of the slurry composition for a non-aqueous secondary battery functional layer, melamine cyanurate was not used, and the amount of the binder (polymer A) was set as 100 parts. The results are shown in Table 2.

Comparative Example 3

Organic particles, a binder, a slurry composition for a non-aqueous secondary battery functional layer, a separator, a negative electrode including a functional layer, a positive electrode including a functional layer, and a secondary battery were produced, and various evaluations were performed in the same way as in Example 9 with the exception that in production of the slurry composition for a non-aqueous secondary battery functional layer, melamine cyanurate was not used, and the amount of the binder (polymer A) was set as 100 parts. The results are shown in Table 2.

In Tables 1 and 2, shown below:
 "Core-shell" indicates organic particles having a core-shell structure;
 "Single polymer" indicates organic particles that are single-polymer particles;
 "MMA" indicates methyl methacrylate unit;
 "BA" indicates n-butyl acrylate unit;
 "MAA" indicates methacrylic acid unit;
 "AMA" indicates allyl methacrylate unit; and
 "ST" indicates styrene unit.

| | | | Example 1 | Example 2 | Example 3 | Example 4 | Example 5 | Example 6 |
|---|---|---|---|---|---|---|---|---|
| Slurry composition | Binder | Type | Polymer A | Polymer A | Polymer A | Polymer A | Polymer A | Polymer A |
| | | Functional groups | Carboxy group Nitrile group Epoxy group Hydroxyl group | Carboxy group Nitrile group Epoxy group Hydroxyl group | Carboxy group Nitrile group Epoxy group Hydroxyl group | Carboxy group Nitrile group Epoxy group Hydroxyl group | Carboxy group Nitrile group Epoxy group Hydroxyl group | Carboxy group Nitrile group Epoxy group Hydroxyl group |
| | | Carboxy group content [mmol/g] | 0.57 | 0.57 | 0.57 | 0.57 | 0.57 | 0.57 |
| | | Nitrile group content [mmol/g] | 2.57 | 2.57 | 2.57 | 2.57 | 2.57 | 2.57 |
| | | Volume-average particle diameter [nm] | 380 | 380 | 380 | 380 | 380 | 380 |
| | | Glass-transition temperature [° C.] | −40 | −40 | −40 | −40 | −40 | −40 |
| | | Amount [parts by mass] | 67 | 67 | 67 | 99 | 56 | 67 |

|  |  |  |  | Example 1 | Example 2 | Example 3 | Example 4 | Example 5 | Example 6 |
|---|---|---|---|---|---|---|---|---|---|
| Melamine compound | Type |  |  | Melamine cyanurate | Ammeline | Melamine | Melamine cyanurate | Melamine cyanurate | Melamine cyanurate |
|  | Amount [parts by mass] |  |  | 33 | 33 | 33 | 1 | 44 | 33 |
| Organic particles | Type |  |  | Core-shell | Core-shell | Core-shell | Core-shell | Core-shell | Core-shell |
|  | Chemical composition | Core portion | MMA | 38.5 | 38.5 | 38.5 | 38.5 | 38.5 | 42.6 |
|  |  |  | BA | 28.6 | 28.6 | 28.6 | 28.6 | 28.6 | 24.5 |
|  |  |  | MAA | 2.8 | 2.8 | 2.8 | 2.8 | 2.8 | 2.8 |
|  |  |  | AMA | 0.1 | 0.1 | 0.1 | 0.1 | 0.1 | 0.1 |
|  |  | Shell portion | ST | 29.5 | 29.5 | 29.5 | 29.5 | 29.5 | 29.5 |
|  |  |  | MAA | 0.5 | 0.5 | 0.5 | 0.5 | 0.5 | 0.5 |
|  | Volume-average particle diameter [nm] |  |  | 500 | 500 | 500 | 500 | 500 | 500 |
|  | Degree of swelling in electrolyte solution [mass %] |  |  | 900 | 900 | 900 | 900 | 900 | 900 |
|  | Glass-transition temperature [° C.] |  |  | 45 | 45 | 45 | 45 | 45 | 56 |
|  | Amount [parts by mass] |  |  | 1000 | 1000 | 1000 | 1000 | 1000 | 1000 |
| Battery member including functional layer |  |  |  | Separator | Separator | Separator | Separator | Separator | Separator |
| Adhesiveness |  |  |  | A | A | A | A | B | B |
| Close adherence strength |  |  |  | A | A | A | A | B | A |
| Rate characteristics |  |  |  | A | A | A | C | A | A |
| Cycle characteristics |  |  |  | A | A | A | B | A | A |

|  |  |  |  |  | Example 7 | Example 8 | Example 9 | Comparative Example 1 | Comparative Example 2 | Comparative Example 3 |
|---|---|---|---|---|---|---|---|---|---|---|
| Slurry composition | Binder | Type |  |  | Polymer A | Polymer A | Polymer A | Polymer A | Polymer A | Polymer A |
|  |  | Functional groups |  |  | Carboxy group Nitrile group Epoxy group Hydroxyl group | Carboxy group Nitrile group Epoxy group Hydroxyl group | Carboxy group Nitrile group Epoxy group Hydroxyl group | Carboxy group Nitrile group Epoxy group Hydroxyl group | Carboxy group Nitrile group Epoxy group Hydroxyl group | Carboxy group Nitrile group Epoxy group Hydroxyl group |
|  |  | Carboxy group content [mmol/g] |  |  | 0.57 | 0.57 | 0.57 | 0.57 | 0.57 | 0.57 |
|  |  | Nitrile group content [mmol/g] |  |  | 2.57 | 2.57 | 2.57 | 2.57 | 2.57 | 2.57 |
|  |  | Volume-average particle diameter [nm] |  |  | 380 | 380 | 380 | 380 | 380 | 380 |
|  |  | Glass-transition temperature [° C.] |  |  | −40 | −40 | −40 | −40 | −40 | −40 |
|  |  | Amount [parts by mass] |  |  | 67 | 67 | 67 | 100 | 100 | 100 |
|  | Melamine compound | Type |  |  | Melamine cyanurate | Melamine cyanurate | Melamine cyanurate | — | — | — |
|  |  | Amount [parts by mass] |  |  | 33 | 33 | 33 | — | — | — |
|  | Organic particles | Type |  |  | Core-shell | Single polymer | Core-shell | Core-shell | Single polymer | Core-shell |
|  |  | Chemical composition | Core portion | MMA | 37.9 | ST: 75 | 38.5 | 38.5 | ST: 75 | 38.5 |
|  |  |  |  | BA | 28.6 | BA: 20 | 28.6 | 28.6 | BA: 20 | 28.6 |
|  |  |  |  | MAA | 2.8 | MAA: 4 | 2.8 | 2.8 | MAA: 4 | 2.8 |
|  |  |  |  | AMA | 0.7 | EDMA: 1 | 0.1 | 0.1 | EDMA: 1 | 0.1 |
|  |  |  | Shell portion | ST | 29.5 |  | 29.5 | 29.5 |  | 29.5 |
|  |  |  |  | MAA | 0.5 |  | 0.5 | 0.5 |  | 0.5 |
|  |  | Volume-average particle diameter [nm] |  |  | 500 | 500 | 500 | 500 | 500 | 500 |
|  |  | Degree of swelling in electrolyte solution [mass %] |  |  | 270 | 200 | 900 | 900 | 200 | 900 |
|  |  | Glass-transition temperature [° C.] |  |  | 45 | 60 | 45 | 45 | 60 | 45 |
|  |  | Amount [parts by mass] |  |  | 1000 | 1000 | 1000 | 1000 | 1000 | 1000 |
| Battery member including functional layer |  |  |  |  | Separator | Separator | Electrode | Separator | Separator | Electrode |
| Adhesiveness |  |  |  |  | B | A | A | D | D | D |
| Close adherence strength |  |  |  |  | A | B | A | D | E | D |
| Rate characteristics |  |  |  |  | A | A | A | D | D | D |
| Cycle characteristics |  |  |  |  | A | A | A | D | D | D |

It can be seen from Tables 1 and 2 that in Examples 1 to 9 in which the used slurry composition contained organic particles, a binder, and a melamine compound and in which the amount of the melamine compound among the total of the binder and the melamine compound was within a specific range, it was possible to cause a functional layer to display excellent adhesiveness and to closely adhere an electrode and a separator strongly to each other while also improving rate characteristics and cycle characteristics of a secondary battery.

On the other hand, it can be seen from Table 2 that in Comparative Examples 1 to 3 in which the used binder composition contained a binder but did not contain a melamine compound, it was not possible to ensure adequate levels of adhesiveness of a functional layer, close adherence strength of an electrode and a separator, and rate characteristics and cycle characteristics of a secondary battery.

INDUSTRIAL APPLICABILITY

According to the present disclosure, it is possible to provide a slurry composition for a non-aqueous secondary battery functional layer with which it is possible to form a functional layer that has excellent adhesiveness and that can improve rate characteristics of a non-aqueous secondary battery.

Moreover, according to the present disclosure, it is possible to provide a functional layer for a non-aqueous secondary battery that has excellent adhesiveness and that can improve rate characteristics of a non-aqueous secondary battery.

Furthermore, according to the present disclosure, it is possible to provide a separator for a non-aqueous secondary battery that can closely adhere well to another battery member that is adjacent thereto and that can cause a non-aqueous secondary battery to display excellent rate characteristics.

Also, according to the present disclosure, it is possible to provide a non-aqueous secondary battery having excellent rate characteristics.

REFERENCE SIGNS LIST 100 organic particle (core-shell structure)
110 core portion
1105 outer surface of core portion
120 shell portion

The invention claimed is:

1. A slurry composition for a non-aqueous secondary battery functional layer comprising organic particles, a binder, and a melamine compound, wherein
the binder is a polymer including a carboxy group-containing monomer unit and a hydroxyl group-containing monomer unit; a polymer including a carboxy group-containing monomer unit and an amide group-containing monomer unit; a polymer including a carboxy group-containing monomer unit, a nitrile group-containing monomer unit, and an amino group-containing monomer unit; or a polymer including a carboxy group-containing monomer unit, an epoxy group-containing monomer unit, a hydroxyl group-containing monomer unit, and a nitrile group-containing monomer unit,
the melamine compound constitutes a proportion of not less than 0.5 mass % and not more than 85 mass % among a total of the binder and the melamine compound,
the melamine compound is a compound represented by the following formula (I) or salts thereof

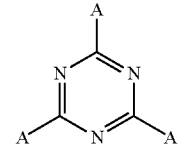

where in formula (I), each A independently represents a hydroxyl group or —NR$^1$R$^2$, R$^1$ and R$^2$ represent, independently of each another, a hydrogen atom, a hydrocarbon group, or a hydroxyl group-containing hydrocarbon group, and in a case in which more than one R$^1$ is present in formula (I), each R$^1$ may be the same or different, and in a case in which more than one R$^2$ is present in formula (I), each R$^2$ may be the same or different, and in the hydrocarbon group and the hydroxyl group-containing hydrocarbon group of R$^1$ and R$^2$, one or more oxygen atoms may be present between carbon atoms, and in a case in which two or more oxygen atoms are present, these oxygen atoms are not adjacent,
the organic particles have a core-shell structure including a core portion and a shell portion at least partially covering an outer surface of the core portion, and
the melamine compound is at least one selected from the group consisting of ammeline and melamine cyanurate.

2. The slurry composition for a non-aqueous secondary battery functional layer according to claim 1, wherein the binder is a polymer including at least one functional group selected from the group consisting of a carboxy group, a hydroxyl group, an amino group, an epoxy group, an oxazoline group, a sulfo group, a nitrile group, and an amide group.

3. The slurry composition for a non-aqueous secondary battery functional layer according to claim 1, wherein the organic particles have a volume-average particle diameter of not less than 150 nm and not more than 2,000 nm.

4. The slurry composition for a non-aqueous secondary battery functional layer according to claim 1, wherein
the binder has a particulate form, and
the organic particles have a larger volume-average particle diameter than the binder.

5. A functional layer for a non-aqueous secondary battery formed using the slurry composition for a non-aqueous secondary battery functional layer according to claim 1.

6. A separator for a non-aqueous secondary battery comprising: a separator substrate; and the functional layer for a non-aqueous secondary battery according to claim 5.

7. A non-aqueous secondary battery comprising the functional layer for a non-aqueous secondary battery according to claim 5.

* * * * *